United States Patent
Lee et al.

(10) Patent No.: US 11,109,239 B2
(45) Date of Patent: Aug. 31, 2021

(54) METHOD FOR COMMUNICATION IN UNLICENSED BAND AND APPARATUS FOR SAME

(71) Applicant: SAMSUNG ELECTRONICS CO., LTD., Suwon-si (KR)

(72) Inventors: Hyung Yeol Lee, Seoul (KR); Dae Ho Kang, Suwon-si (KR); Chang Won Nam, Seoul (KR); Sung Jin Park, Seoul (KR); Won Joon Cho, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 16/485,225

(22) PCT Filed: Feb. 14, 2018

(86) PCT No.: PCT/KR2018/001971
§ 371 (c)(1),
(2) Date: Aug. 12, 2019

(87) PCT Pub. No.: WO2018/151550
PCT Pub. Date: Aug. 23, 2018

(65) Prior Publication Data
US 2019/0373481 A1    Dec. 5, 2019

(30) Foreign Application Priority Data

Feb. 16, 2017    (KR) .................. 10-2017-0021224

(51) Int. Cl.
*H04W 16/14*    (2009.01)
*H04L 1/00*    (2006.01)
(Continued)

(52) U.S. Cl.
CPC .......... *H04W 16/14* (2013.01); *H04L 1/0026* (2013.01); *H04W 24/10* (2013.01); *H04W 72/085* (2013.01)

(58) Field of Classification Search
CPC ... H04W 16/14; H04W 24/10; H04W 72/085; H04W 36/36; H04W 52/0277;
(Continued)

(56) References Cited

U.S. PATENT DOCUMENTS 8,565,178 B2    10/2013    Cheng et al.
8,767,666 B2    7/2014    Cheng et al.
(Continued)

FOREIGN PATENT DOCUMENTS

KR    10-2013-0133204    12/2013
KR    10-2017-0016942    2/2017
WO    2016/047975    3/2016

OTHER PUBLICATIONS

International Search Report for PCT/KR2018/001971 dated May 30, 2018, 4 pages.
(Continued)

*Primary Examiner* — Ayaz R Sheikh
*Assistant Examiner* — Louis Samara
(74) *Attorney, Agent, or Firm* — Nixon & Vanderhye, P.C.

(57) ABSTRACT

An electronic device is disclosed. The electronic device includes a communication circuitry that supports to transmit and receive data with a base station on a licensed band and an unlicensed band, a processor, and a memory electrically connected with the processor. The memory stores instructions, when executed, causing the processor to configure a first cell on a licensed band and configure a second cell on an unlicensed band, among a plurality of cells associated with the base station, trigger an unlicensed band preferred
(Continued)

mode, and transmit control information for inducing to increase an amount of data transmitted and received over the unlicensed band to the base station, based on the triggering of the unlicensed band preferred mode. In addition, various embodiments recognized through the specification are possible.

11 Claims, 16 Drawing Sheets

(51) Int. Cl.
  *H04W 24/10* (2009.01)
  *H04W 72/08* (2009.01)
(58) Field of Classification Search
  CPC .... H04W 12/08; H04L 1/0026; H04L 1/1812; H04L 5/14
  See application file for complete search history.

(56) References Cited

U.S. PATENT DOCUMENTS

| | | | |
|---|---|---|---|
| 8,995,331 B2 | 3/2015 | Kazmi et al. | |
| 9,467,276 B2 | 10/2016 | Wei | |
| 9,468,015 B2 | 10/2016 | Cheng et al. | |
| 9,474,089 B2 | 10/2016 | Wei | |
| 9,491,310 B2 | 11/2016 | Griot et al. | |
| 9,549,360 B2 | 1/2017 | Khawer et al. | |
| 9,572,040 B2 | 2/2017 | Wei | |
| 9,642,162 B2 | 5/2017 | Wei | |
| 9,918,333 B2 | 3/2018 | Cheng et al. | |
| 9,942,912 B2 | 4/2018 | Cheng et al. | |
| 10,237,890 B2 | 3/2019 | Kim et al. | |
| 2012/0307748 A1* | 12/2012 | Cheng | H04L 1/1812 370/329 |
| 2012/0322487 A1* | 12/2012 | Stanforth | H04W 16/14 455/509 |
| 2013/0188552 A1 | 7/2013 | Kazmi et al. | |
| 2014/0023022 A1 | 1/2014 | Cheng et al. | |
| 2014/0254524 A1 | 9/2014 | Cheng et al. | |
| 2015/0109971 A1 | 4/2015 | Wei | |
| 2015/0109975 A1* | 4/2015 | Wei | H04L 5/14 370/280 |
| 2015/0110010 A1 | 4/2015 | Wei | |
| 2015/0110011 A1 | 4/2015 | Wei | |
| 2015/0133081 A1* | 5/2015 | Griot | H04M 15/00 455/407 |
| 2015/0245219 A1 | 8/2015 | Wei | |
| 2016/0014610 A1* | 1/2016 | Wong | H04L 1/0026 455/454 |
| 2016/0014797 A1 | 1/2016 | Cheng et al. | |
| 2016/0014798 A1 | 1/2016 | Cheng et al. | |
| 2016/0135143 A1* | 5/2016 | Won | H04W 12/08 370/312 |
| 2016/0219487 A1* | 7/2016 | Khawer | H04W 52/0277 |
| 2017/0238330 A1* | 8/2017 | Jiang | H04W 72/0453 370/329 |
| 2018/0176890 A1* | 6/2018 | Moon | H04W 16/14 |

OTHER PUBLICATIONS

Written Opinion of the ISA for PCT/KR2018/001971 dated May 30, 2018, 7 pages.

* cited by examiner

METHOD FOR COMMUNICATION IN UNLICENSED BAND AND APPARATUS FOR SAME

This application is the U.S. national phase of International Application No. PCT/KR2018/001971 filed Feb. 14, 2018 which designated the U.S. and claims priority to KR Patent Application No. 10-2017-0021224 filed Feb. 16, 2017, the entire contents of each of which are hereby incorporated by reference.

TECHNICAL FIELD

The disclosure relates to technologies of transmitting and receiving signals on a licensed band or an unlicensed band in a wireless communication system.

BACKGROUND ART

With the universal spread of smartphones, there has been an explosion in mobile data traffic. Carrier aggregation (CA) technology has been introduced as one method for solving this in $3^{rd}$ generation partnership project (3GPP) long term evolution (LTE). Herein, the CA technology is a technology of allocating a primary carrier component (PCC) to a primary cell (PCell), allocating the other secondary carrier components to a secondary cell (SCell), aggregating several bandwidth combinations to transmit data and is one of technologies of effectively increasing a transmission bandwidth in a communication technology. Furthermore, by employing licensed-assisted access (LAA) of configuring a carrier allocated to the SCell among carriers according to carrier aggregation on an unlicensed band (e.g., a frequency band for Wi-Fi) in 3GPP LTE standard to overcome a limit of bandwidth due to the above-mentioned increase in mobile data traffic, it is additionally attempted to increase a bandwidth of a cellular communication system. Moreover, before discussing the LAA, a discussion about LTE-unlicensed (LTE-U) which uses an unlicensed frequency band as an LTE frequency band is actively in progress.

A conventional cellular system or LAA/LTE-U system will use an unlicensed band as the concept of a supplementary downlink (SDL). According to the conventional cellular system or LAA/LTE-U system, when a base station transmits data, a user equipment or an electronic device may receive the data according to scheduling of the base station over a licensed band and an unlicensed band.

In the conventional cellular system, the base station transmits data to a use using only a licensed band. Charging data generated in a packet-gateway (P-GW), a serving-gateway (S-GW), or the like which is a core network is transmitted to an offline charging system (OFCS) or an online charging system (OCS), it is not necessary to display whether a path of data transmitted to the user is a licensed band or an unlicensed band and it is not necessary for the charging system to know it.

When a conventional cellular system is applied to an LTE or LTE-U system, because a user receives data according to scheduling of a base station, it is difficult to adjust usages of a licensed band and an unlicensed band. Because a licensed band and an unlicensed band are not classified in view of charging, unnecessary costs are paid.

For data which is not sensitive to a data transmission delay, the user may want to perform wireless communication over an unlicensed band with a very small fee without using wireless communication over a licensed band with a relatively large fee. However, the conventional cellular system or LAA/LTE-U system does not have a system for increasing availability of the user, for example, for determining preference of the user for an unlicensed band or increasing data usage on the unlicensed band depending on the preference of the user.

For a communication system which uses a licensed band and an unlicensed band at the same time, there is a large difference between maintenance costs on the licensed band and the unlicensed band in view of an operator. Thus, it is expected to divide amounts of data transmission for the licensed band the unlicensed band and apply a separate charging rate. However, because a P-GW or S-GW counts packets and generates charging data in the conventional cellular system, it may be difficult to distinguish a fee between the licensed band and the unlicensed band.

Summary

In accordance with an aspect of the disclosure, an electronic device is provided. The electronic device may include a communication circuitry that supports to transmit and receive data with a base station on a licensed band and an unlicensed band, a processor, and a memory electrically connected with the processor. The memory may store instructions, when executed, causing the processor to configure a first cell on a licensed band and configure a second cell on an unlicensed band, among a plurality of cells associated with the base station, obtain triggering of an unlicensed band preferred mode, and transmit control information for inducing to increase an amount of data transmitted and received over the unlicensed band to the base station, based on the triggering of the unlicensed band preferred mode.

In accordance with another aspect of the disclosure, an electronic device is provided. The electronic device may include a display, a communication circuitry that supports to transmit and receive data with a base station on a licensed band and an unlicensed band, a processor, and a memory electrically connected with the processor. The memory may store instructions, when executed, causing the processor to output a first screen including an item for setting an unlicensed band preferred mode on the display and obtain a user input through the item for setting the unlicensed band preferred mode.

In accordance with another aspect of the disclosure, a method is provided. The method may include configuring a first cell on a licensed band and configuring a second cell on an unlicensed band, among a plurality of cells associated with a base station, obtaining triggering of an unlicensed band preferred mode, and transmitting control information for inducing to increase an amount of data transmitted and received over the unlicensed band to the base station, based on the triggering of the unlicensed band preferred mode.

According to embodiments disclosed in the disclosure, the electronic device may reflect whether the user prefers an unlicensed band in a communication operation with a base station to receive data over the unlicensed band. Thus, availability of the user may be enhanced.

According to embodiments disclosed in the disclosure, the electronic device may provide a user interface to reflect whether the user prefers the unlicensed band.

According to embodiments disclosed in the disclosure, the electronic device may divide the amount of data transmission between a licensed band and the unlicensed band, thus generating charging information about each band.

In addition, various effects directly or indirectly ascertained through the disclosure may be provided.

DETAILED DESCRIPTION OF EXAMPLE EMBODIMENTS

Figure 1:
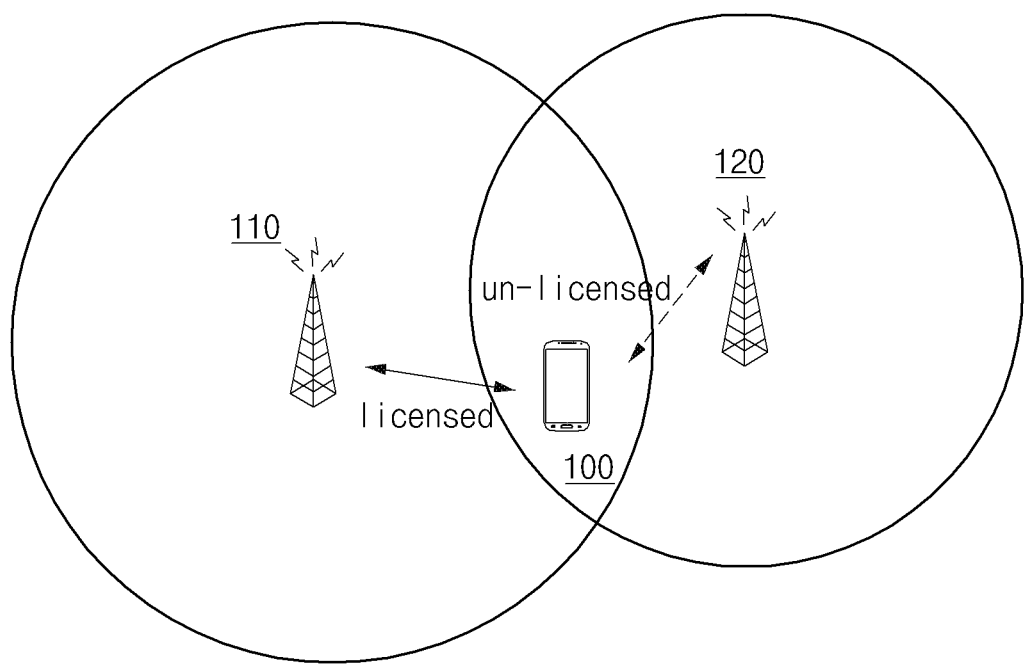
FIG. 1 illustrates a network environment to which the disclosure is applicable.

Hereinafter, various embodiments of the disclosure may be described with reference to accompanying drawings. Accordingly, those of ordinary skill in the art will recognize that modification, equivalent, and/or alternative on the various embodiments described herein can be variously made without departing from the scope and spirit of the disclosure. With regard to description of drawings, similar components may be marked by similar reference numerals.

In the disclosure, the expressions "have", "may have", "include" and "comprise", or "may include" and "may comprise" used herein indicate existence of corresponding features (e.g., components such as numeric values, functions, operations, or parts) but do not exclude presence of additional features.

In the disclosure, the expressions "A or B", "at least one of A or/and B", or "one or more of A or/and B", and the like may include any and all combinations of one or more of the associated listed items. For example, the term "A or B", "at least one of A and B", or "at least one of A or B" may refer to all of the case (1) where at least one A is included, the case (2) where at least one B is included, or the case (3) where both of at least one A and at least one B are included.

The terms, such as "first", "second", and the like used in the disclosure may be used to refer to various components regardless of the order and/or the priority and to distinguish the relevant components from other components, but do not limit the components. For example, "a first user device" and "a second user device" indicate different user devices regardless of the order or priority. For example, without departing the scope of the disclosure, a first component may be referred to as a second component, and similarly, a second component may be referred to as a first component.

It will be understood that when an component (e.g., a first component) is referred to as being "(operatively or communicatively) coupled with/to" or "connected to" another component (e.g., a second component), it may be directly coupled with/to or connected to the other component or an intervening component (e.g., a third component) may be present. In contrast, when an component (e.g., a first component) is referred to as being "directly coupled with/to" or "directly connected to" another component (e.g., a second component), it should be understood that there are no intervening component (e.g., a third component).

According to the situation, the expression "configured to" used in the disclosure may be used as, for example, the expression "suitable for", "having the capacity to", "designed to", "adapted to", "made to", or "capable of". The term "configured to" must not mean only "specifically designed to" in hardware. Instead, the expression "a device configured to" may mean that the device is "capable of" operating together with another device or other parts. For example, a "processor configured to (or set to) perform A, B, and C" may mean a dedicated processor (e.g., an embedded processor) for performing a corresponding operation or a generic-purpose processor (e.g., a central processing unit (CPU) or an application processor) which performs corresponding operations by executing one or more software programs which are stored in a memory device.

Terms used in the disclosure are used to describe specified embodiments and are not intended to limit the scope of the disclosure. The terms of a singular form may include plural forms unless otherwise specified. All the terms used herein, which include technical or scientific terms, may have the same meaning that is generally understood by a person skilled in the art. It will be further understood that terms, which are defined in a dictionary and commonly used, should also be interpreted as is customary in the relevant related art and not in an idealized or overly formal unless expressly so defined in various embodiments of the disclosure. In some cases, even if terms are terms which are defined in the disclosure, they may not be interpreted to exclude embodiments of the disclosure.

An electronic device according to various embodiments of the disclosure may include at least one of, for example, smartphones, tablet personal computers (PCs), mobile phones, video telephones, electronic book readers, desktop PCs, laptop PCs, netbook computers, workstations, servers, personal digital assistants (PDAs), portable multimedia players (PMPs), Motion Picture Experts Group (MPEG-1 or MPEG-2) Audio Layer 3 (MP3) players, mobile medical devices, cameras, or wearable devices. According to various embodiments, the wearable device may include at least one of an accessory type (e.g., watches, rings, bracelets, anklets, necklaces, glasses, contact lens, or head-mounted-devices (HMDs), a fabric or garment-integrated type (e.g., an electronic apparel), a body-attached type (e.g., a skin pad or tattoos), or a bio-implantable type (e.g., an implantable circuit).

Hereinafter, electronic devices according to various embodiments will be described with reference to the accompanying drawings. In the disclosure, the term "user" may refer to a person who uses an electronic device or may refer to a device (e.g., an artificial intelligence electronic device) that uses the electronic device.

FIG. 1 illustrates a network environment to which the disclosure is applicable.

Referring to FIG. 1, an electronic device 100 may transmit and receive a signal with a base station 110 on a licensed band. The electronic device 100 may transmit and receive a signal with a base station 120 on an unlicensed band. The electronic device 100 may support a carrier aggregation technology. The licensed band may be configured in a PCell among a plurality of carriers. The unlicensed band may be configured in an SCell. Hereinafter, an electronic device in an embodiment of the disclosure may be referred to as a terminal, a user equipment (UE), a user device, or the like.

The base station 110 may transmit and receive a signal with the electronic device 100 on the licensed band. The base station 110 may be referred to as a base station, an evolved NodeB (eNB), or a base station (BS). The base station 120 may transmit and receive a signal with the electronic device 100 on the unlicensed band. The base station 120 may be referred to as a base station, such as a base station, an evolved NodeB (eNB), a base station (BS), an LAA base station, or an LTE-U base station, capable of performing cellular communication over the unlicensed band. In FIG. 1, an embodiment is exemplified as the electronic device 100 transmits and receives the signal with the base station 120 on the unlicensed band. However, the electronic device 100 may transmit and receive a signal with the base station 110 on the licensed band and/or the unlicensed band. According to various embodiments, the base station 110 and the base station 120 may be base stations which logically differ from each other. For example, the base station 110 and the base station 120 may be base stations having different logical identifiers (IDs). The base station 110 and the base station 120 may be installed in physically the same location or may be installed in different locations. The electronic device 100 may be an electronic device 200 of FIG. 2, an electronic device 400 of FIG. 4, an electronic device 600 of FIG. 6, an electronic device 1000 of FIG. 10, an electronic device 1501 of FIG. 15, or an electronic device 1601 of FIG. 16.

In an embodiment, a network established by the base stations 110 and 120 may support long term evolution (LTE), LTE-A, LTE-U, or LAA technology. The LTE may be a part of evolved UMTS (E-UMTS) which uses evolved universal terrestrial radio access (E-UTRA), and employs orthogonal frequency division multiple access (OFDMA) in a downlink and employs single carrier frequency division multiple access (SC-FDMA) in an uplink. The LTE-advanced (LTE-A) system is a system in which a 3GPP LTE system is enhanced.

According to various embodiments disclosed in the disclosure, the electronic device 100 may perform communication on the unlicensed band with the base station 110 and/or the base station 120.

The electronic device 100 according to various embodiments disclosed in the disclosure may perform a method for setting an unlicensed band preferred mode, a method for transmitting related control information over an unlicensed band in the electronic device 100, a method for setting the unlicensed band preferred mode through a user interface, a method for measuring data usage of each of the unlicensed band and a licensed band, or a method for transmitting charging information based on usage of each of the unlicensed band the licensed band. The unlicensed band preferred mode may be a mode which is required to first use the unlicensed band when transmitting a signal to a base station or when receiving a signal from the base station.

Figure 2:
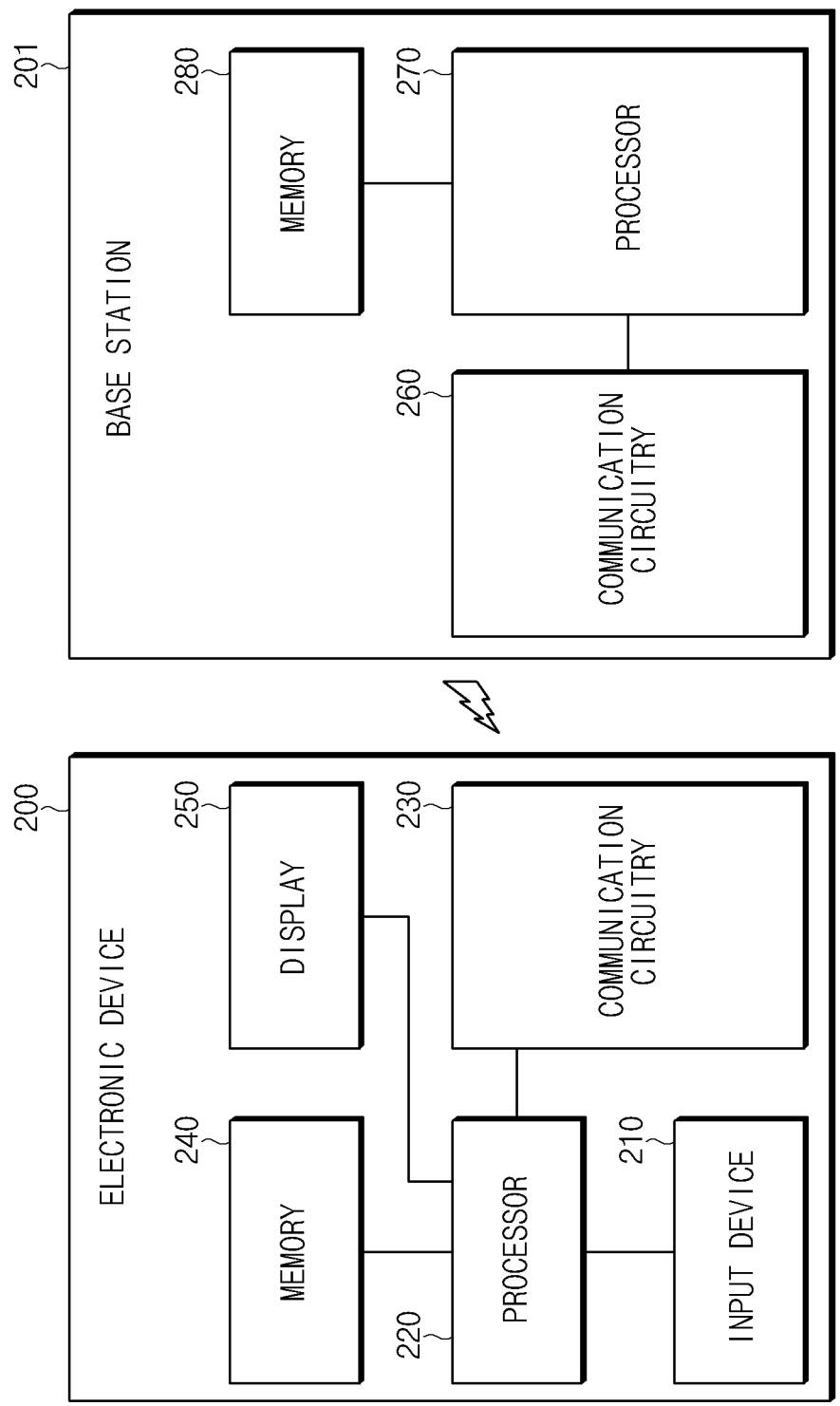
FIG. 2 is a block diagram illustrating configurations of an electronic device and a base station according to an embodiment of the disclosure.

FIG. 2 is a block diagram illustrating configurations of an electronic device and a base station according to an embodiment of the disclosure.

According to an embodiment, an electronic device 200 may include an input device 210, a processor 220, a communication circuitry 230, a memory 240, and/or a display 250. The configuration of the electronic device 200, shown in FIG. 2, is illustrative, and various modifications capable of implementing various embodiments disclosed in the disclosure are possible. For example, the electronic device 200 may include a configuration such as an electronic device 400 of FIG. 4, an electronic device 600 of FIG. 6, an electronic device 1000 of FIG. 10, an electronic device 1501 of FIG. 15, or an electronic device 1601 of FIG. 1601 or may be suitably modified using the configuration.

According to an embodiment, the electronic device 200 may obtain an input from a user via the input device 210. For example, configuration information for the unlicensed band preferred mode or a selection of the user for the unlicensed band preferred mode may be obtained via the input device 210. The input device 210 may include, for example, at least some components included in an input device 1650 shown in FIG. 16. The input device 210 may obtain a user input via, for example, a touch panel 1652, a pen sensor 1654, or the like.

According to an embodiment, the processor 220 may be connected with the communication circuitry 230. The processor 220 may be connected with the communication circuitry 230 via, for example, a bus (e.g., a bus 1510 of FIG. 15). The processor 220 may perform various operations according to various embodiments disclosed in the disclosure and may control the communication circuitry 230. In an embodiment, the processor 220 may obtain triggering of an unlicensed band preferred mode. When the unlicensed band preferred mode is triggered, the processor 220 may control the communication circuitry 230 to transmit information about the unlicensed band preferred mode. For example, the processor 220 may transmit channel state information or unlicensed band preferred mode information.

According to an embodiment, the processor 220 may include one or more of a central processing unit (CPU), an application processor (AP), or a communication processor (CP). The communication circuitry 230 may support a carrier aggregation technology. For example, the communication circuitry 230 may transmit a signal on an unlicensed band or a licensed band or may receive a signal transmitted over the unlicensed band or the licensed band. The communication circuitry 230 may include the same or similar configuration to a communication circuitry 231 of FIG. 8, a communication circuitry 232 of FIG. 9, a communication interface 1570 of FIG. 15, or a communication module 1620 of FIG. 16. The communication circuitry 230 may include, for example, a cellular module 1621 or a radio frequency (RF) module 1629.

According to an embodiment, the memory 240 may store data. In an embodiment, the memory 240 may include an instruction set for performing an operation of the processor 220. In an embodiment, the memory 240 may store user configuration information. For example, the memory 240 may store information about an unlicensed band preferred mode setting.

According to an embodiment, the display 250 may output a video, an image, or the like. The display 250 may output, for example, an item, a user interface, and/or the like associated with the unlicensed band preferred mode.

According to an embodiment, a base station 201 may include a communication circuitry 260, a processor 270, and/or a memory 280. The configuration of the electronic device 201, shown in FIG. 2, is illustrative, and various modifications capable of implementing various embodiments disclosed in the disclosure are possible.

Figure 15:
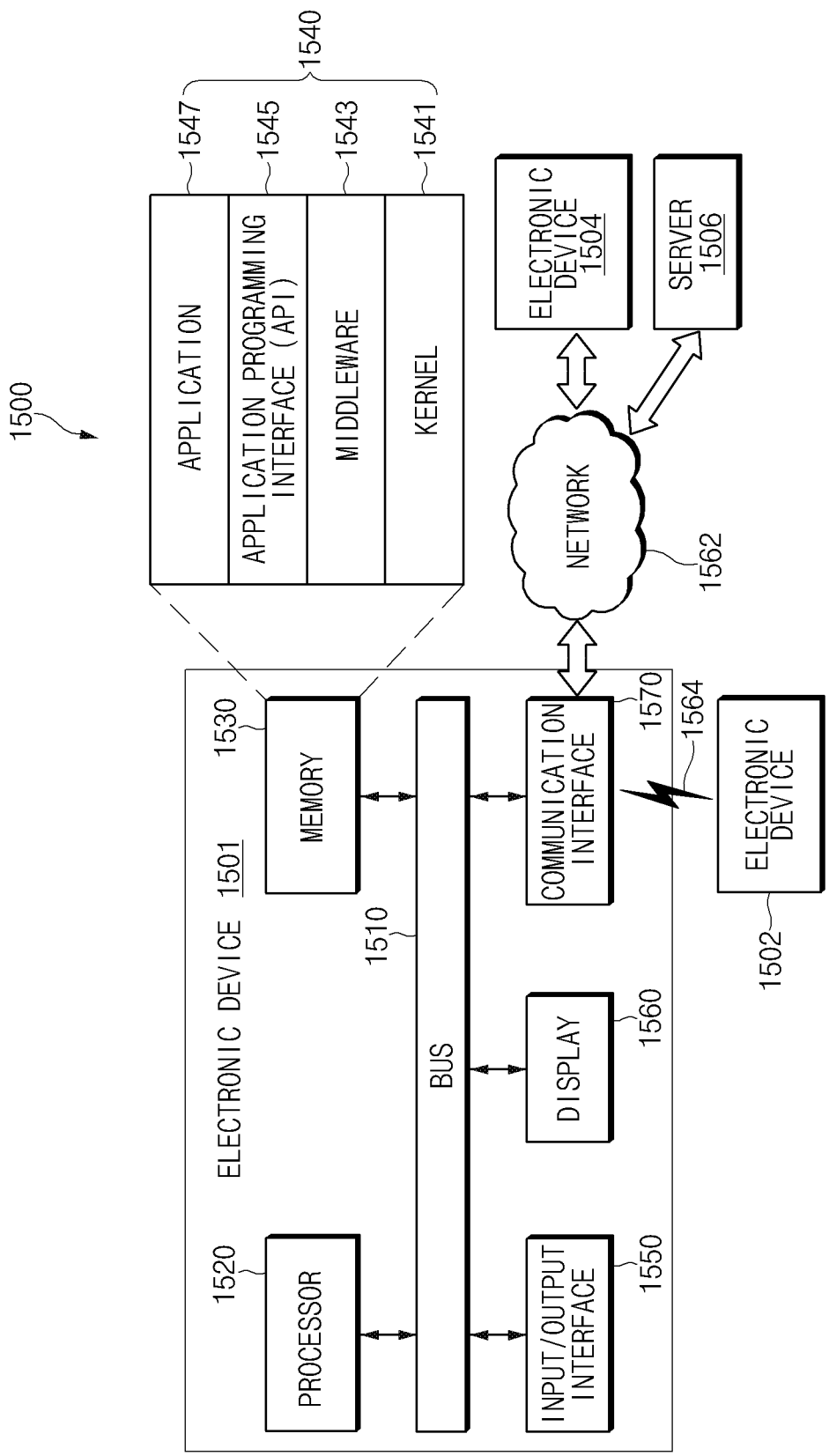
FIG. 15 illustrates an electronic device in a network environment according to various embodiments.

According to an embodiment, the processor 270 may be connected with the communication circuitry 260 via a bus (e.g., the bus 1510 of FIG. 15). The processor 270 may perform an operation according to various embodiments disclosed in the disclosure and may control the communication circuitry 260. For example, the processor 270 may determine whether to bias data to an unlicensed band based on information received from the electronic device 200. In an embodiment, the processor 270 may include an application processor (AP) and/or a communication processor (CP).

According to an embodiment, the communication circuitry 260 may transmit a signal on the unlicensed band and/or the licensed band or may receive a signal transmitted over the unlicensed band and/or the licensed band.

According to an embodiment, the memory 280 may store an instruction set for performing an operation of the processor 270 according to an embodiment. The memory 280 may be electrically connected with the processor 270.

Figure 3:
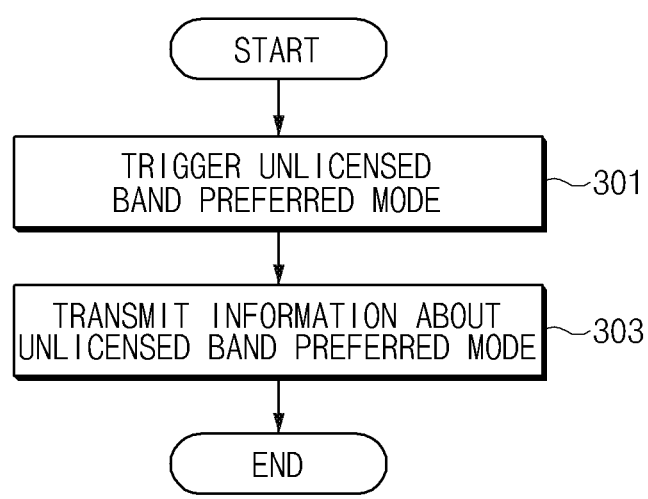
FIG. 3 is an operational flowchart of an electronic device according to an embodiment.

FIG. 3 is an operational flowchart of an electronic device according to an embodiment.

Referring to FIG. 3, a description will be given of a method for performing communication in an unlicensed band preferred mode in an electronic device (e.g., an electronic device 200 or a processor 220 of FIG. 2).

In operation 301, the electronic device may trigger the unlicensed band preferred mode. For example, when a user selects the unlicensed band preferred mode or when a specified condition is met, the electronic device may trigger the unlicensed band preferred mode.

In operation 303, the electronic device may transmit information about the unlicensed band preferred mode to a base station (e.g., a base station 201 of FIG. 2) based on the triggering of the unlicensed band preferred mode. The information about the unlicensed band preferred mode may be, for example, control information for directly or indirectly inducing the base station to bias data to an unlicensed band. The information about the unlicensed band preferred mode may be, for example, unlicensed band preferred mode information for providing a notification of an intention of the user to prefer the unlicensed band or channel state information transmitted to induce to bias data.

Figure 4:
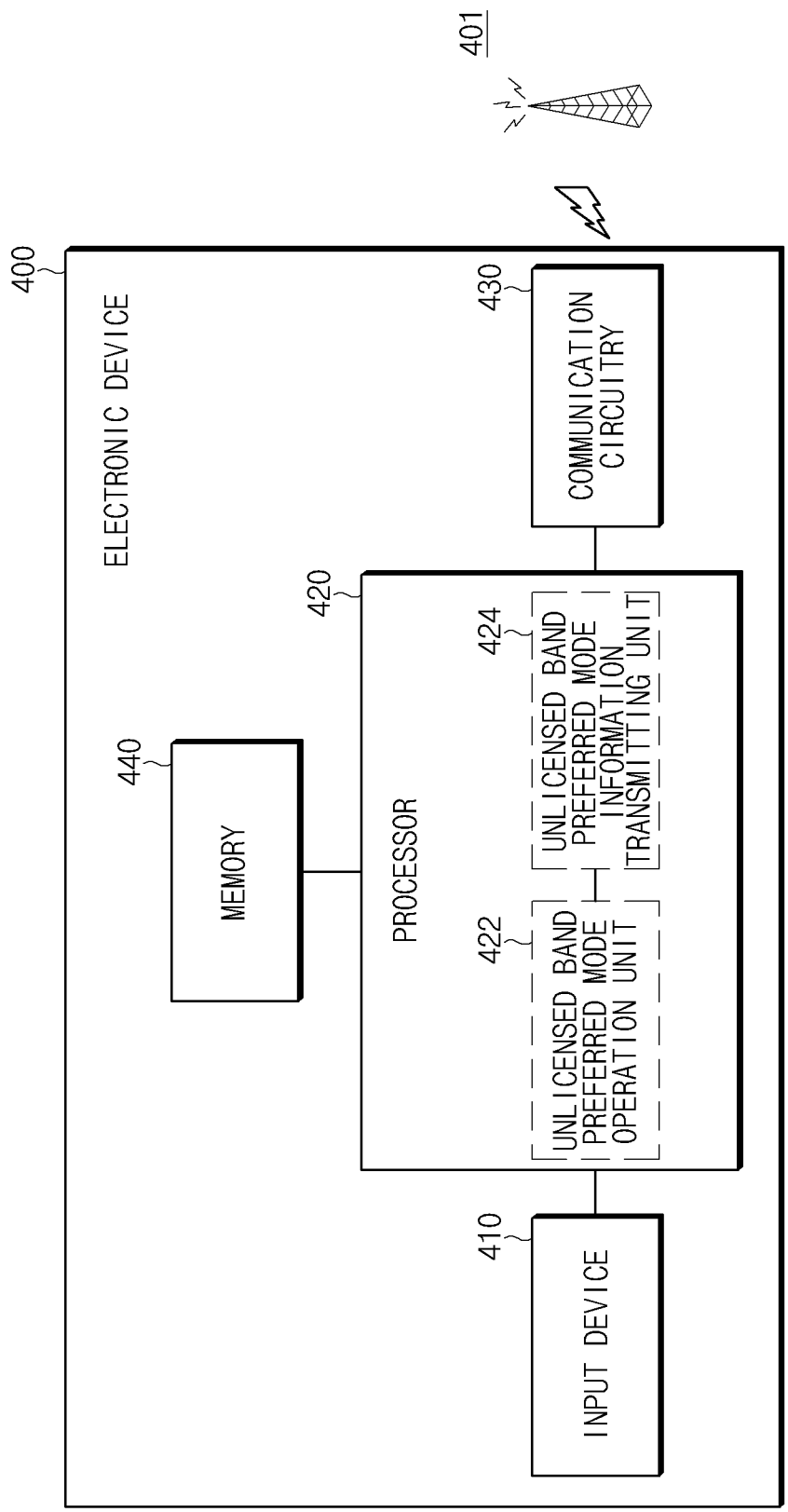
FIG. 4 is a block diagram illustrating a configuration of an electronic device according to another embodiment of the disclosure.

FIG. 4 is a block diagram illustrating a configuration of an electronic device according to another embodiment of the disclosure.

According to an embodiment, an electronic device 400 may transmit unlicensed band preferred mode information to a base station 401 based on a selection of a user for an unlicensed band preferred mode. Referring to FIG. 4, the electronic device 400 may include an input device 410, a processor 420, a communication circuitry 430, and/or a memory 440. Because the communication circuitry 430 and the memory 440 correspond to a communication circuitry 230 and a memory 240 of FIG. 2, respectively, a duplicated description will be omitted below for convenience of description.

According to an embodiment, the input device 410 may obtain a user input. In an embodiment, the input device 410 may obtain the selection of the user for the unlicensed band preferred mode. For example, the selection of the user may be obtained based on a touch input of the user. In an embodiment, a user interface like FIG. 11 may be provided for the touch input of the user.

According to an embodiment, the processor 420 may trigger the unlicensed band preferred mode based on the selection of the user. The processor 420 may trigger the unlicensed band preferred mode and may generate unlicensed band preferred mode information for providing a notification of an intention of the user to prefer an unlicensed band. The processor 420 may transmit the generated unlicensed band preferred mode information to the base station 401 via the communication circuitry 430.

According to an embodiment, the processor 420 may include an unlicensed band preferred mode operation unit 422 and/or an unlicensed band preferred mode information transmitting unit 424. The sub-components of the processor 420 may be implemented with hardware or software. For example, the unlicensed band preferred mode operation unit 422 and/or the unlicensed band preferred mode information transmitting unit 424 may be implemented with instructions stored in the memory 440 or may be a part of a circuit constituting the processor 420.

According to an embodiment, the unlicensed band preferred mode operation unit 422 may trigger the unlicensed band preferred mode based on the obtained user input.

The unlicensed band preferred mode information transmitting unit 424 may generate unlicensed band preferred mode information for providing a notification that the user prefers data transmission and reception on an unlicensed band. When the unlicensed band preferred mode is triggered, the unlicensed band preferred mode information transmitting unit 424 may generate the unlicensed band preferred mode information. The processor 420 may control the communication circuitry 430 to transmit the unlicensed band preferred mode information.

According to an embodiment, the unlicensed band preferred mode information may be transmitted through a flag signal. The flag signal may be transmitted over, for example, a physical uplink control channel (PUCCH). The electronic device 400 may use an existing PUCCH format or a newly defined message format to transmit the flag signal.

In current 3GPP LTE, PUCCH format 1, 1a, 1b, 2, 2a, 2b, 3, 4, or 5 is defined as a transport format of the PUCCH which is an uplink physical control channel. The electronic device 400 may use, for example, at least one of predefined PUCCH formats to transmit the flag signal.

According to an embodiment, the electronic device 400 may use, for example, a new message format. For example, a new message format of 1-bit size, including the unlicensed band preferred mode information, may be defined. The electronic device 400 may use the new message format to transmit the flag signal.

For another example, the electronic device 400 may use a partial payload space of a physical uplink shared channel (PUSCH). The electronic device 400 may transmit the flag information over a data channel rather than using a control channel.

According to an embodiment, the communication circuitry 430 may transmit the unlicensed band preferred mode information to the base station 401. In an embodiment, the communication circuitry 430 may transmit the unlicensed band preferred mode information through a PCell. In an embodiment, the PCell may be configured on a licensed band.

According to an embodiment, in the unlicensed band preferred mode, an amount of data transmitted and received on the unlicensed band (e.g., an amount of data transmission or data usage) may be greater than an amount of data before the unlicensed band preferred mode is set. Assuming that the electronic device 400 receives data of the same size, a rate transmitted on the unlicensed band among all of the corresponding data may be greater in the unlicensed band preferred mode than when not in the unlicensed band preferred mode. For example, when the electronic device 400 in a normal mode where carrier aggregation is configured receives data from the base station 401 and operates in the unlicensed band preferred mode, an amount of data transmitted over the unlicensed band in the unlicensed band preferred mode may be greater than an amount of data transmitted over the unlicensed band in the normal mode.

When receiving the unlicensed band preferred mode information, the base station 401 may bias at least a portion of data to be transmitted over a licensed band to the unlicensed band. Although it takes a longer time to transmit data, the base station 401 may assign additional data to the unlicensed band. When a channel state of the licensed band is good, the base station 401 may assign more data to the unlicensed band.

Figure 5:
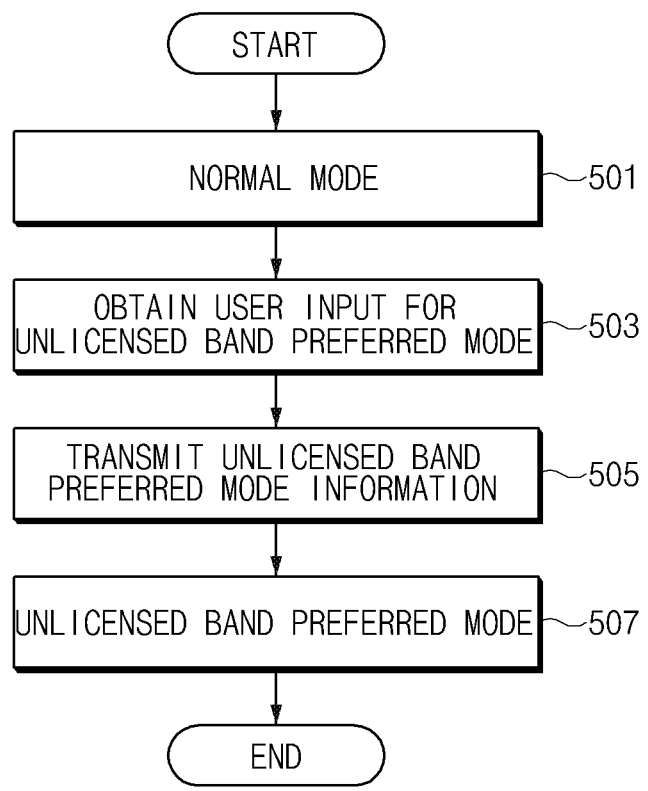
FIG. 5 is an operational flowchart of an electronic device according to an embodiment of the disclosure.

FIG. 5 is an operational flowchart of an electronic device according to an embodiment of the disclosure.

Referring to FIG. 5, a description will be given of a method for performing communication in an unlicensed band preferred mode in an electronic device (e.g., an electronic device 400 or a processor 420 of FIG. 4).

In operation 501, the electronic device may operate in a normal mode. The normal mode may indicate an operation mode of the electronic device in which carrier aggregation is configured. In the normal mode, an unlicensed band may be in an activation state where data transmission and reception is activated or an add state where a frequency band is added in carrier aggregation. The electronic device may configure one of cells associated with a base station on a licensed band and may configure at least one on the unlicensed band. The electronic device may configure, for example, cells associated with the base station on the licensed band or the unlicensed band depending on configuration information transmitted from the base station. The electronic device may add a cell to the unlicensed band or may change a cell configured on the unlicensed band, in a state where the cell is configured on the licensed band. The electronic device according to an embodiment may transmit a signal to the base station or may receive a signal from the base station, over at least the licensed band in the normal mode.

In operation 503, the electronic device may obtain a user input for the unlicensed band preferred mode. According to an embodiment, the electronic device may obtain a user input through a user interface shown in FIG. 11.

In operation 505, the electronic device may transmit unlicensed band preferred mode information. In an embodiment, the unlicensed band preferred mode information may be information for providing a notification that the electronic device or a user prefers data transmission and reception over the unlicensed band. In an embodiment, the unlicensed band preferred mode information may be transmitted through a flag signal. Alternatively, the unlicensed band preferred mode information may be flag information including the unlicensed band preferred mode information. For example, as described in detail with reference to FIG. 4, the electronic device may transmit flag information over a PUCCH or a PUSCH. Alternatively, the electronic device may transmit flag information through a newly defined signal.

In operation 507, the electronic device may operate in the unlicensed band preferred mode. An amount of data the electronic device receives in the unlicensed band preferred mode over the unlicensed band from the base station may be greater than that in the normal mode. Data transmitted from the base station in the unlicensed band preferred mode may be biased from the licensed band to the unlicensed band. To set the unlicensed band preferred mode, the electronic device capable of supporting LAA or LTE-U may configure at least one of a plurality of carriers for communication on the unlicensed band.

The operation of the electronic device, shown in FIG. 5, is illustrative, and various modifications capable of implementing various embodiments disclosed in the disclosure are possible. For example, after operation 507 is first performed, operation 505 may be performed.

Figure 6:
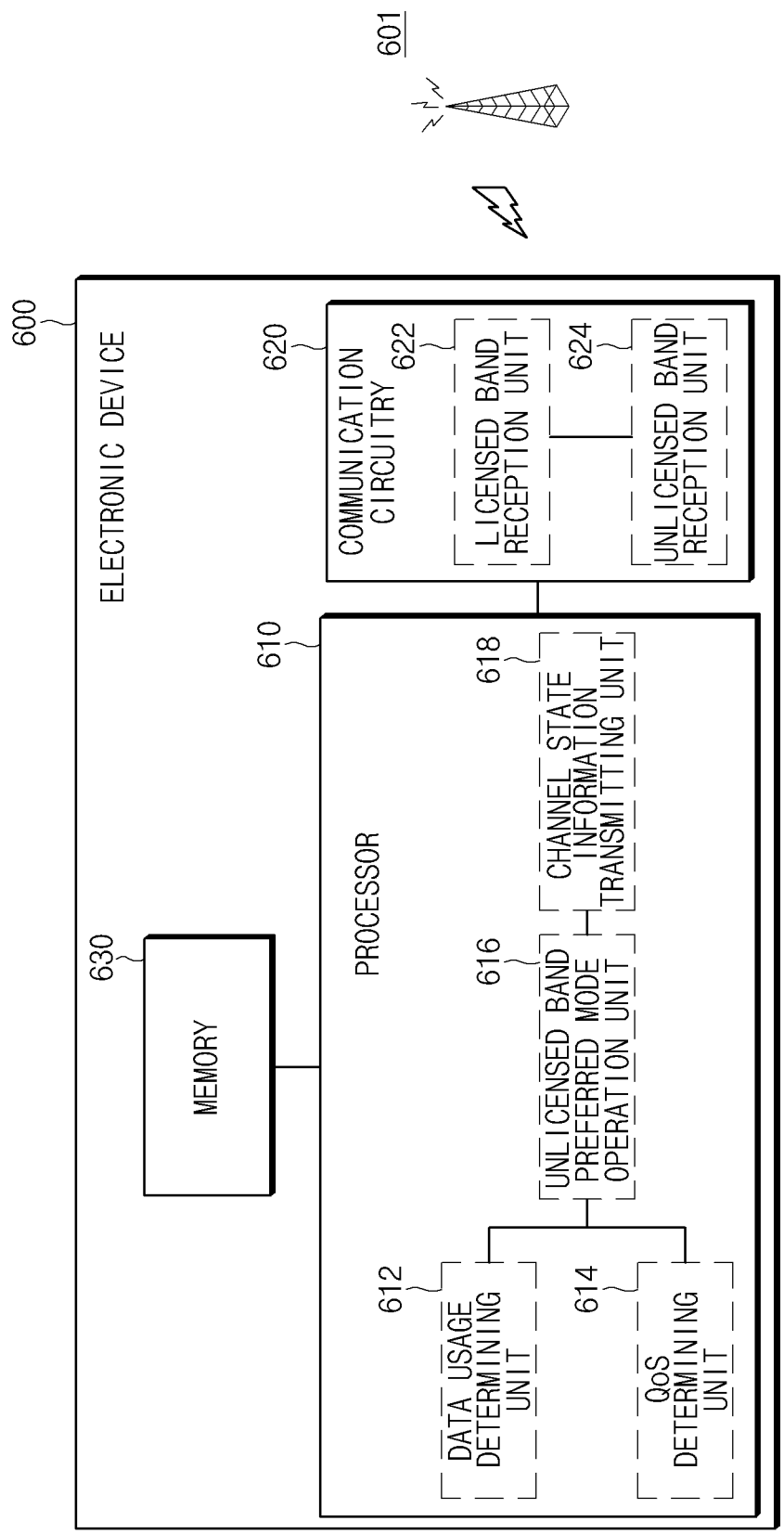
FIG. 6 is a block diagram illustrating a configuration of an electronic device according to another embodiment of the disclosure.

FIG. 6 is a block diagram illustrating a configuration of an electronic device according to another embodiment of the disclosure.

An electronic device 600 of FIG. 6 may perform a method for automatically triggering an unlicensed band mode. Referring to FIG. 6, the electronic device 600 may include a processor 610, a communication circuitry 620, and/or a memory 630. It is shown that a base station 601 of FIG. 6 is one, but, as shown in FIG. 1, the base station 601 may include one or more base stations. The base station 601 may include base stations which are installed in a physically the same location or are installed in physically different locations. The base station 601 may include physically different base stations. The electronic device 100 may transmit and receive a signal with, for example, one base station on at least a licensed band and may transmit and receive with another base station on an unlicensed band.

According to an embodiment, the electronic device 600 may determine a specified condition and may trigger the unlicensed band preferred mode. In a situation where a PCell configured on the licensed band and an SCell configured on the unlicensed band are carried aggregated to be operated, the electronic device 100 may induce to increase an amount of data on the unlicensed band using channel state information to operate in the unlicensed band preferred mode.

According to an embodiment, the processor 610 may trigger the unlicensed band preferred mode. In an embodiment, when the specified condition is met, the processor 610 may trigger the unlicensed band preferred mode. The specified condition may be associated with configuration information about the unlicensed band preferred mode. The specified condition may be associated with at least one of data usage, a QoS level, a specific time region, or a date. The specified condition may be obtained via, for example, an input device (e.g., an input device 210 of FIG. 2) from a user.

According to an embodiment, when the unlicensed band preferred mode is triggered, the processor 610 may generate channel state information for inducing to bias data to the unlicensed band. The processor 610 may transmit the generated channel state information to the base station 601 via the communication circuitry 620. The channel state information may be information for indirectly inducing to bias data.

According to an embodiment, the processor 610 may generate channel state information indicating that a channel state is bad to induce to bias data. The processor 610 may transmit channel state information indicating a channel state which is worse than a real channel state of the licensed band from the base station 601 to induce the base station 601 to bias at least a portion of data to the unlicensed band.

In an embodiment, the channel state information may be a channel quality indicator (CQI). In the CQI according to an embodiment, to induce the base station 601 to offload data to the unlicensed band, a base station CQI of the licensed band may have a value of a low range. The CQI may have, for example, a value different from a real CQI value measured in a certain time range, in the electronic device 600. For example, the CQI may have a value lower than a CQI value measured by the electronic device 600.

According to an embodiment, the processor 610 may include a data usage determining unit 612, a quality of service (QoS) determining unit 614, an unlicensed band preferred mode operation unit 616, and/or a channel state information determining unit 618. The sub-components of the processor 420 may be implemented with hardware or software. For example, the data usage determining unit 612 may be implemented with instructions stored in a memory (e.g., 630) or may be a part of a circuit constituting the processor 610.

According to an embodiment, the data usage determining unit 612 and/or the QoS determining unit 614 may determine whether the specified condition is met.

According to an embodiment, the data usage determining unit 612 may determine data usage on the unlicensed band and/or the licensed band. In an embodiment, the data usage determining unit 612 may determine data usage on the licensed band. The data usage determining unit 612 may determine whether the data usage on the licensed band meets the specified condition. The data usage on the unlicensed band or the licensed band may be usage due to a setting of the user or any setting of the electronic device. For an operation in the data usage determining unit 612, the electronic device 600 may separately measure data usage of the unlicensed band and the licensed band.

According to an embodiment, the QoS determining unit 614 may determine a QoS level of a specific time. In an embodiment, the QoS determining unit 614 may determine a QoS level of a current time. The QoS determining unit 614 may determine whether the QoS level meets the specified condition.

According to an embodiment, when the specified condition is met, the unlicensed band preferred mode operation unit 616 may trigger the unlicensed band preferred mode.

According to an embodiment, the channel state information determining unit 618 may measure or determine a channel state of the unlicensed band and/or the licensed band and may generate channel state information. The channel state information determining unit 618 may generate channel state information for inducing to transmit and receive data on the unlicensed band. For example, the channel state information determining unit 618 may generate channel state information indicating a channel state which is worse than the measured channel state. According to an embodiment, the electronic device 600 may transmit channel state information indicating a channel state which is worse than an actually measured channel state to the base station 601 to allow the base station 601 to determine that a channel situation of the licensed band (or a PCell) is bad and to induce the base station 601 to transmit and receive more data on the unlicensed band (or an SCell) than the licensed band. Because the channel state information is to induce to bias data to the unlicensed band, it may be channel state information about the licensed band for providing a notification that a channel state of the licensed band is not good.

In an embodiment, when the unlicensed band preferred mode is triggered, the electronic device 600 may control the communication circuitry 620 to transmit the generated channel state information. In an embodiment, the channel state information may include a CQI having a value lower than a CQI measured based on an actually received signal. According to an embodiment, the communication circuitry 620 may transmit the generated channel state information (e.g., the CQI) to the base station 601. In an embodiment, the communication circuitry 620 may transmit the channel state information through the PCell. In an embodiment, the PCell may be configured on the licensed band.

According to an embodiment, the communication circuitry 620 may include a licensed band reception unit 622 and an unlicensed band reception unit 624. The licensed band reception unit 622 may receive a signal of the licensed band from the base station 601. The unlicensed band reception unit 624 may receive a signal of the unlicensed band from the base station 601. The electronic device 600 may determine an amount of data received via each of the licensed band reception unit 622 and the unlicensed band reception unit 624. The licensed band reception unit 622 and/or the unlicensed band reception unit 624 may correspond to a cellular module 1621 of FIG. 16.

Although not illustrated in FIG. 6, the electronic device 600 may further include an input device (e.g., an input device 210 of FIG. 2). The electronic device 600 may obtain a user input via the input device. In an embodiment, the electronic device 600 may obtain configuration information about the unlicensed band preferred mode of the user via the input device. For example, the configuration information may include information about data usage on the licensed band, time information, and/or weather information. In an embodiment, the input device may be a touch panel. For example, the configuration information may be obtained based on a touch input of the user. In an embodiment, a user interface like FIG. 13 may be provided to obtain the configuration information about the unlicensed band preferred mode of the user.

According to the embodiment of FIG. 6, the base station 601 may assign saved resources to another electronic device. Thus, an effect of more efficiently using resources and an effect of offloading a load of the licensed band to the unlicensed band may be obtained at the same time.

According to an embodiment, the base station 601 may transmit and receive a signal over the licensed band and/or the unlicensed band. In an embodiment, when receiving channel state information according to the unlicensed band preferred mode, the base station 601 may additionally assign data to be transmitted to the unlicensed band. For example, the base station 601 may bias at least a portion of data which is reserved for transmission over the licensed band to the unlicensed band. Assuming that the base station 601 already transmits data to the electronic device 600 over the licensed band and the unlicensed band, receiving channel state information, the base station 601 may more increase a rate of data transmitted over the unlicensed band among all data, than before receiving the channel state information.

Figure 7:
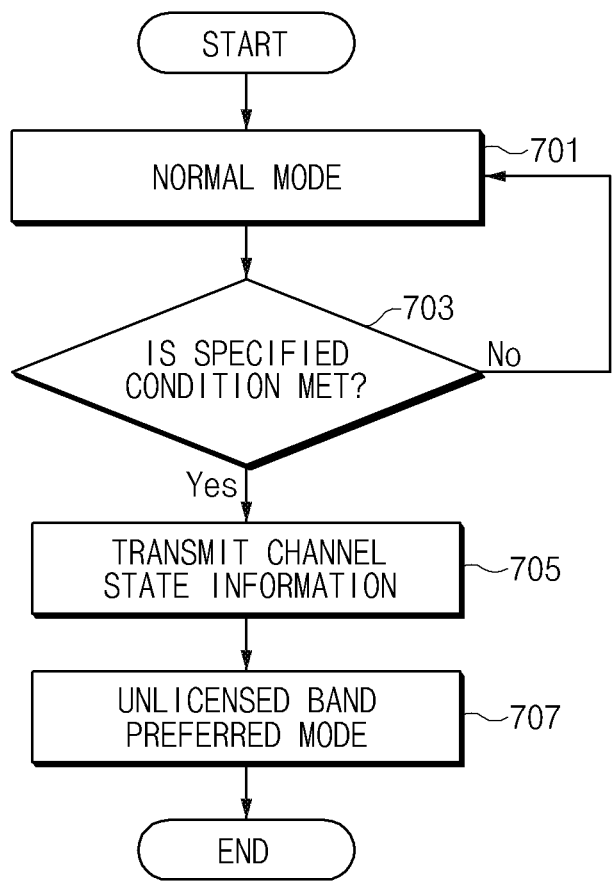
FIG. 7 is an operational flowchart of an electronic device according to another embodiment of the disclosure.

FIG. 7 is an operational flowchart of an electronic device according to another embodiment of the disclosure.

Referring to FIG. 7, a description will be given of a method for automatically setting an unlicensed band preferred mode and performing communication in the unlicensed band preferred mode in an electronic device (e.g., an electronic device 600 or a processor 610 of FIG. 6).

In operation 701, the electronic device may operation in a normal mode. The electronic device of the normal mode may perform an operation of a state where carrier aggregation is configured. For example, the electronic device may transmit and receive a signal with a based station on only a licensed band or may transmit and receive a signal with the base station on the licensed band and an unlicensed band.

In operation 703, the electronic device may determine whether a specified condition is met to trigger an unlicensed band preferred mode. For example, the electronic device may determine whether a condition associated with data usage is met to trigger the unlicensed band preferred mode.

When the specified condition is not met, the electronic device may perform operation 701. The electronic device may maintain the operation of the normal mode. When the specified condition is met, in operation 705, the electronic device may transmit channel state information. The channel state information may be information used in the electronic device or used to bias data to the unlicensed band. The channel state information may be information used in the electronic device to induce to be less assigned resources on the licensed band.

The electronic device may transmit, for example, a channel quality indicator (CQI). The electronic device may transmit a CQI having a low value to a base station for licensed band transmission to induce the base station to perform unlicensed band transmission. The CQI may have a value which is lower than a CQI measured based on a receive signal by the electronic device.

In operation 707, the electronic device may operate in the unlicensed band preferred mode. In the unlicensed band preferred mode, the electronic device may receive more data on the unlicensed band than the normal mode.

The specified condition may be associated with at least one of, for example, licensed band data usage from a reference date to a current date, a quality of service (QoS) level of a service to be received, and a time and date when the service to be received is received.

The specified condition may include whether data usage accumulated during a certain time meets a first threshold. The electronic device may determine whether the accumulated data usage is greater than the first threshold. The accumulated data usage may be data usage on the licensed band.

The specified condition may include whether a QoS related parameter meets a specific value. The specified condition may include whether, for example, the QCI meets the specific value. The electronic device may determine whether the QCI is greater than a second threshold. Because the higher the QCI value, the lower the delay sensitivity, it may be advantageous to use the unlicensed band when the QCI has a large value in view of the user.

The operation of the electronic device, shown in FIG. 7, is illustrative, and various modifications capable of implementing various embodiments disclosed in the disclosure are possible. For example, operation 707 may be performed earlier than operation 705 in a terminal. According to the electronic device and the operation of the electronic device in FIGS. 4 to 7, unlicensed band mode information or channel state information indicating a low channel state may be transmitted to reduce an amount of data transmitted and received over the licensed band. Thus, in view of the base station, because it is able to assign data to be used on the licensed band to another terminal, resources may be used more efficiently. In view of the user, a gain of the user may be provided in terms of fees through data transmission and reception over the unlicensed band.

A description will be given of a configuration of a communication circuitry applicable to various embodiments with reference to FIGS. 8 and 9.

Figure 8:
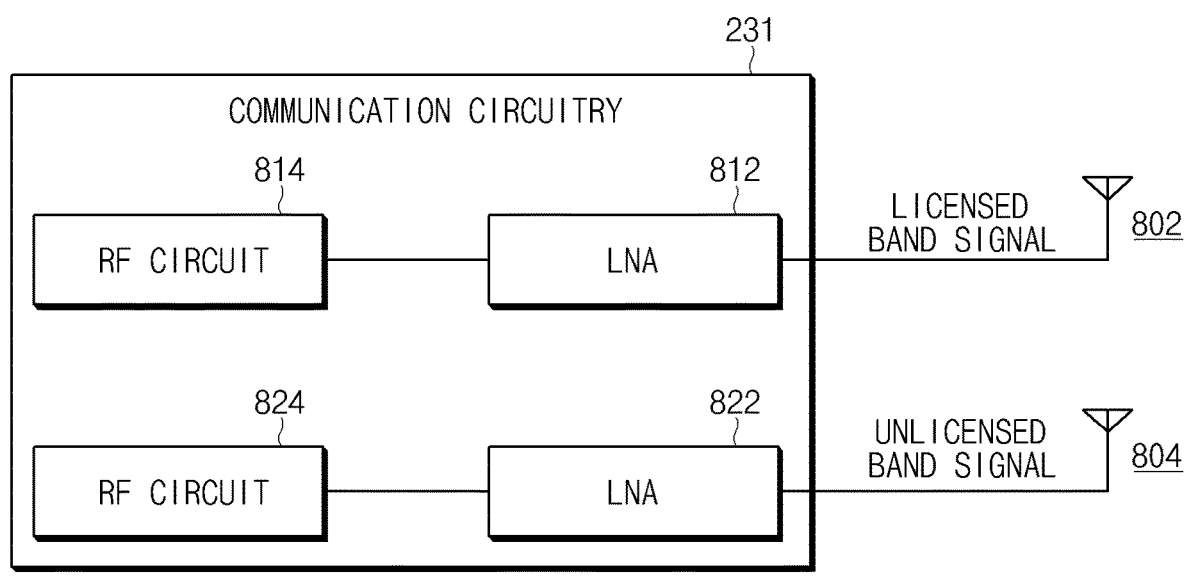
FIG. 8 illustrates an example of a communication circuitry for separately measuring data usage of a licensed band and an unlicensed band of an electronic device according to embodiments of the disclosure.

FIG. 8 illustrates a communication circuitry for separately measuring data usage of a licensed band and an unlicensed band of an electronic device according to an embodiment. A communication circuitry 231 of FIG. 8 may receive a licensed band signal and an unlicensed band signal via different antennas 802 and 804, respectively. Referring to FIG. 8, an electronic device (e.g., an electronic device 400 of FIG. 4) may transmit or receive the licensed band signal via the antenna 802. The electronic device may transmit or receive the unlicensed band signal via the antenna 804.

According to an embodiment, the communication circuitry 231 may include an amplification circuit (e.g., a low noise amplifier (LNA)) 812 and/or a radio frequency (RF) circuit 814 for processing the licensed band signal and an amplification circuit 822 and/or an RF circuit 824 for processing the unlicensed band signal.

According to an embodiment, the amplification circuit 812 or 822 may be a low noise amplifier. The low noise amplifier 812 or 822 may be an amplification circuit for amplifying a weak signal in the antenna 802 or 804. In FIG. 8, the low noise amplifiers 812 and 822 are shown as components independent of the antennas 802 and 804, but the low noise amplifiers 812 and 822 may be components respectively embedded in the antennas 802 and 804.

According to an embodiment, the RF circuit 814 or 824 may be an RF integrated circuit. The RF circuit 814 or 824 may be a circuit which operates in a frequency range suitable for a wireless communication system. In an embodiment, the RF circuit 814 or 824 may include a component such as a filter and/or a mixer. In an embodiment, the RF circuit 814 may process a receive signal or a transmit signal of a licensed band, and the RF circuit 824 may process a receive signal or a transmit signal of an unlicensed band. In an embodiment, the signal processed by the RF circuit 814 or 824 may be delivered to a communication module (e.g., a cellular module 1721 of FIG. 16).

Figure 9:
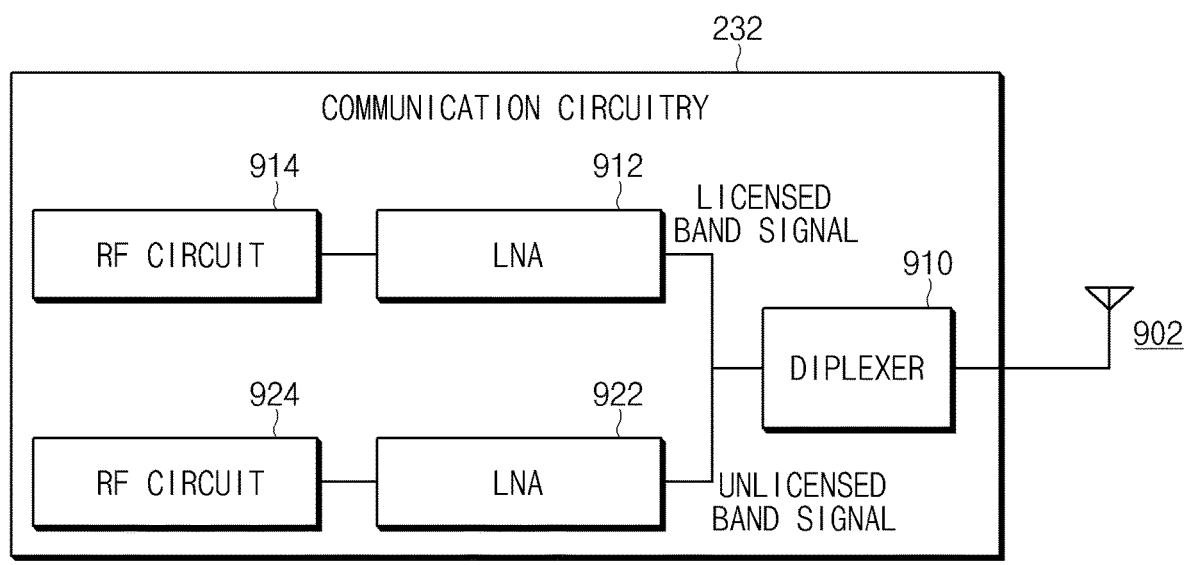
FIG. 9 illustrates another example of a communication circuitry for separately measuring data usage of a licensed band and an unlicensed band of an electronic device according to embodiments of the disclosure.

FIG. 9 illustrates a communication circuitry for separately measuring data usage of a licensed band and an unlicensed band of an electronic device according to an embodiment. A communication circuitry 232 of FIG. 9 may receive a licensed band signal and an unlicensed band signal via one antenna 902. Referring to FIG. 9, an electronic device (e.g., an electronic device 400 of FIG. 4) may transmit or receive the licensed band signal and/or the unlicensed band signal via the antenna 902.

According to an embodiment, the communication circuitry 232 may include a diplexer 910 for dividing the licensed band signal and the unlicensed band signal, an amplification circuit (e.g., an LNA) 912 and/or an RF circuit 914 for processing the divided licensed band signal and an amplification circuit 922 and/or an RF circuit 924 for processing the divided unlicensed band signal.

According to an embodiment, because the amplification circuits 912 and 914 and the RF circuits 922 and 924 are duplicated by components of FIG. 8, a duplicated description will be emitted below.

According to an embodiment, the diplexer 910 may be a circuit for dividing two different frequency signals. The diplexer 910 may be a circuit in which two different frequency signals share one line. In an embodiment, the electronic device may transmit signals of different frequencies via one antenna using the diplexer 910 or may divide signals of different frequencies received via the one antenna. The diplexer 910 may include a low pass filter (LPF) and/or a high pass filter (HPF).

Because conventional charging information is generated in a high layer such as a core network, an unlicensed band and a licensed band may fail to be divided. Alternatively, a conventional high layer may fail to know an amount of data transmission on the unlicensed band and the licensed band, or the like. Hereinafter, a description will be given of an operation of an electronic device for dividing charging on an unlicensed band and a licensed band according to various embodiments. As an embodiment, the electronic device may generate charging information on the unlicensed band and charging information on the licensed band and may transmit to a charging information processing server.

Figure 10:
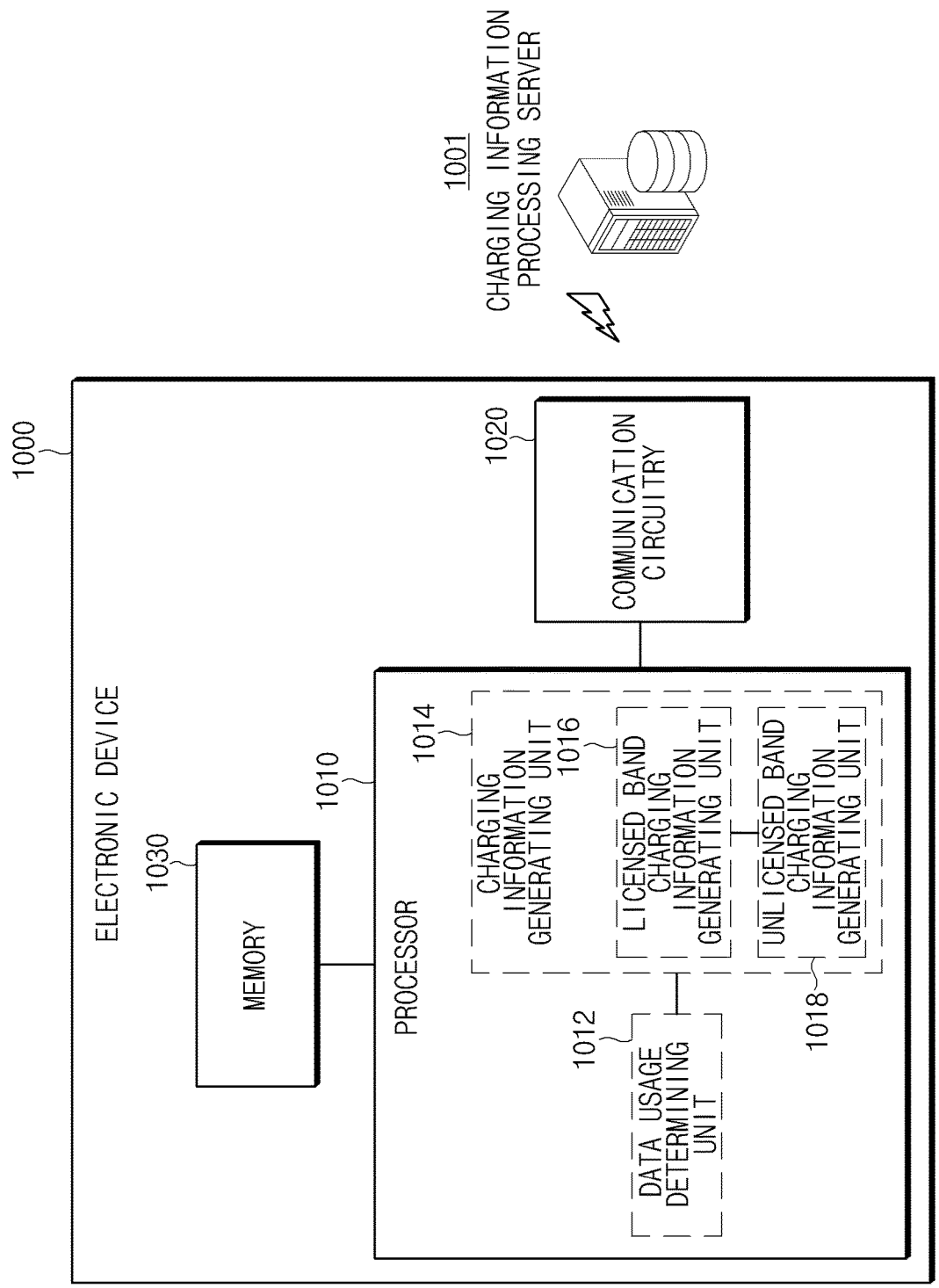
FIG. 10 is a block diagram illustrating a configuration of an electronic device according to another embodiment of the disclosure.

FIG. 10 is a block diagram illustrating a configuration of an electronic device according to another embodiment of the disclosure.

According to an embodiment, an electronic device 1000 may determine data usage on an unlicensed band and/or data usage on a licensed band and may transmit charging information about the unlicensed band and/or charging information about the licensed band to a charging information processing server 1001.

Referring to FIG. 10, the electronic device 1000 according to an embodiment may include a processor 1010, a communication circuitry 1020, and/or a memory 1030. Because the communication circuitry 1020 and the memory 1030 correspond to a communication circuitry 230 and a memory 240 of FIG. 2, respectively, a duplicated description will be omitted below.

According to an embodiment, the processor 1010 may measure or determine data usage on an unlicensed band and/or data usage on a licensed band. For example, the processor 1010 may measure a transmitted amount of data transmitted over the unlicensed band from a base station (e.g., a base station 601 of FIG. 6). The processor 1010 may measure a transmitted amount of data transmitted over the licensed band from the base station.

According to an embodiment, the processor 1010 may generate charging information (e.g., data usage). The processor 1010 may generate charging information about the unlicensed band and/or charging information about the licensed band.

According to an embodiment, the processor 1010 may include an AP and/or a CP. In an embodiment, some or all of functions of the processor 1010 may be performed in the AP. In an embodiment, some or all of the functions of the processor 1010 may be performed in the CP. For example, the data usage on the unlicensed band and/or the data usage on the licensed band may be measured or determined in the CP. The charging information about the unlicensed band and/or the charging information about the licensed band may be generated in the AP. The processor 1010 may control the communication circuitry 1020 to transmit the generated charging information to the charging information processing server 1001.

According to an embodiment, the processor 1010 may include a data usage determining unit 1012 and/or a charging information generating unit 1014. In an embodiment, the data usage determining unit 1012 may determine data usage on the licensed band based on a signal received via the communication circuitry 1020. The data usage determining unit 1012 may determine data usage on the unlicensed band based on a signal received via the communication circuitry 1020.

According to an embodiment, the charging information generating unit 1014 may include a licensed band charging information generating unit 1016 and/or an unlicensed band charging information generating unit 1018. The licensed band charging information generating unit 1016 may generate charging information based on the data usage on the licensed band. The unlicensed band charging information generating unit 1018 may generate charging information based on the data usage on the unlicensed band.

According to an embodiment, the sub-components of the processor 1010 may be implemented with hardware or software. For example, the data usage determining unit 1012 may be implemented with instructions stored in a memory (e.g., 1030) or may be a part of a circuit constituting the processor 1010.

According to an embodiment, the communication circuitry 1020 may transmit the charging information about the unlicensed band and/or the charging information about the licensed band to the charging information processing server 1001.

According to an embodiment, the charging information processing server 1001 may receive charging information transmitted over a network (e.g., LTE) from the electronic device 1000. The charging information processing server 1001 may determine charging for the unlicensed band and charging for the licensed band based on the charging information.

In an embodiment, the unlicensed band may be configured in an SCell. In this case, the data usage of the unlicensed band may be data usage in the SCell where the unlicensed band is configured. In an embodiment, when an LTE-U/LAA system transmits data to the electronic device 1000, the electronic device 1000 may calculate data usage in the SCell as follows.

In an embodiment, the electronic device 1000 may calculate data usage based on a data throughput. The electronic device 1000 may calculate a data throughput using a specific protocol (e.g., 3GPP). Hereinafter, a method for calculating a data throughput is described based on the 3GPP 36.213 standard document, but various protocols are applicable to the method for calculating the data throughput.

According to an embodiment, the electronic device 1000 may calculate a throughput of the SCell based on a table defined as the number of resource blocks (RBs) assigned to the SCell, a modulation and coding scheme (MCS) index, and a transport block size (TBS). In an embodiment, the table may refer to the table 7.1.7.2.1-1 of the standard document '3GPP TS 36.213 v9.2.0'. In an embodiment, a base station (e.g., a base station 601 of FIG. 6) may determine an MCS index based on a channel state between the electronic device 1000 and the base station. The MCS index may be mapped to a TBS index. The base station may determine a TBS based on the number of the allocated RBs. In an embodiment, the electronic device 1000 may determine a throughput as Equation 1 below based on the TBS.

$$\text{Throughput} = TBS \times 1000 \text{[bits/sec]} \quad \text{[Equation 1]}$$

In Equation 1, the throughput may be the throughput or the amount of data transmission and the TBS may be the transport block size. According to an embodiment, the base station may calculate the throughput.

According to an embodiment, as shown in FIGS. 8 and 9, the electronic device 1000 may receive signals of a PCell (or a licensed band) and an SCell (or an unlicensed band) via different receive antennas 802 and 804 or via the same antenna 902, may divide each signal using a diplexer 910, and may obtain the divided signals through independent paths on hardware. As such, the electronic device 1000 may divide two signals at a communication module.

In another embodiment, the base station may generate charging information and may transmit the generated charging information to the charging information processing server 1001.

Because to generate and transmit the charging information in the electronic device 100 is based on information received from the electronic device 1000, accuracy may be high and separate implementation may fail to be required in view of an operator. To transmit charging information in the base station may be performed after a separate standard should be defined, but, according to the electronic device in an embodiment, because it is able to perform transmission through an application, the definition of the separate standard may fail to be required.

Based on the electronic device of FIG. 10, a user may divide data received over the unlicensed band and data received over the licensed band, having different user charging policies, and may use division measurement information in which an amount of each data is measured.

In an embodiment, the user may know a feature of a service to be currently received through a normal mode and may check usage of the licensed band the unlicensed band. The user may turn on a desired communication mode (e.g., an unlicensed band preferred mode) depending on an economic, temporal, or spatial situation and may adaptively select and use a wireless communication service.

In an embodiment, the user may perform a simple user setting (e.g., a QoS level or current usage) through the normal mode. The user may adaptively receive data over the licensed band and the unlicensed band. Thus, availability in an unlicensed band cellular network market may be increased.

In an embodiment, the division measurement information may be used such that the user compares details charged at an operator. The division measurement information may be transmitted in the form of a charging server application of a core network and may be used to determine real charging details in a charging entity institution.

In an embodiment, when an operator separately provides a service according to an unlicensed band signal, the electronic device may transmit configuration information of an unlicensed configuration mode using a protocol between the operator and the base station. In this case, the user may select an unlicensed band preferred mode depending on user preference or may perform a setting of the unlicensed band preferred mode through a user interface of a terminal, using division measurement information of an amount of data received over the licensed band and the unlicensed band.

Figure 11:
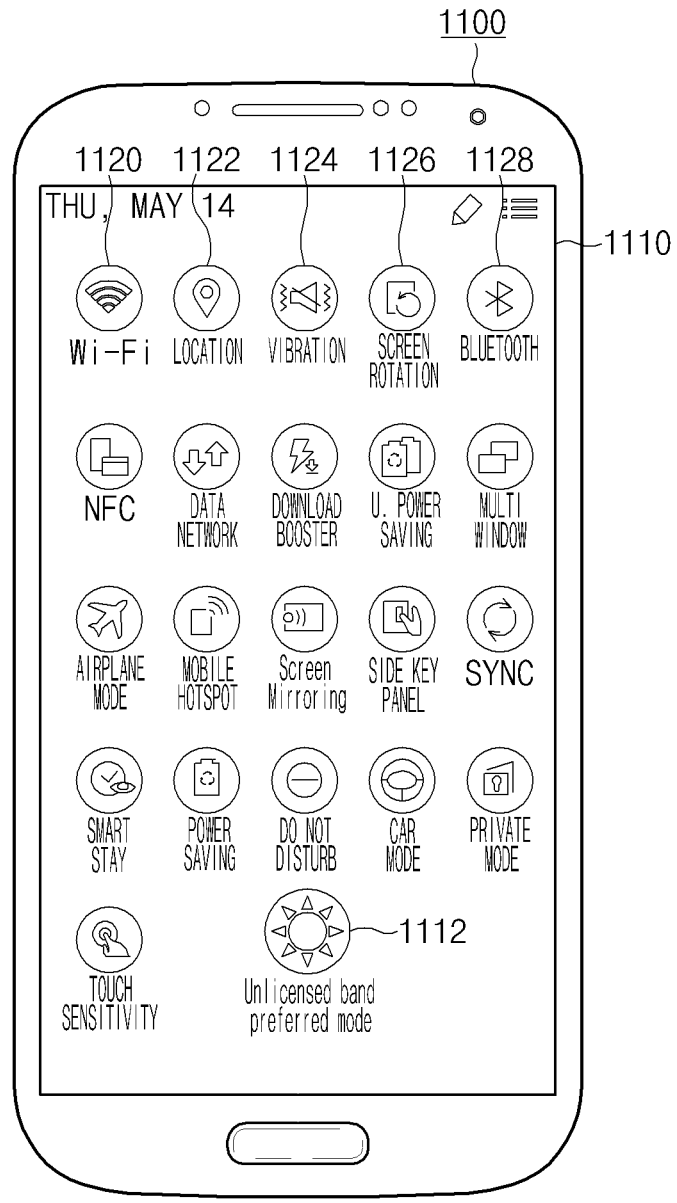
FIG. 11 illustrates an exemplary user interface output on an electronic device according to an embodiment of the disclosure.

FIG. 11 illustrates an exemplary user interface output on an electronic device according to an embodiment of the disclosure.

Referring to FIG. 11, an electronic device 1100 according to an embodiment may display an item 1112 associated with an unlicensed band preferred mode on a screen 1110. When the electronic device 1100 operates in a specified mode, for example, a normal mode, it may display the item 1112 associated with the unlicensed band preferred mode on the screen. In another embodiment, the electronic device 1100 may enable the item 1112 associated with the unlicensed band preferred mode in the normal mode. In an embodiment, the electronic device 1100 may obtain a user selection through the item 1112 associated with the unlicensed band preferred mode. In another embodiment, when a specified condition is met, the electronic device 1100 may enable the item 1112 associated with the unlicensed band preferred mode.

According to an embodiment, when a user applies an input (e.g., a touch input) to the item 1112 associated with the unlicensed band preferred mode on the screen 1110, the electronic device 1100 may trigger the unlicensed band preferred mode. In an embodiment, the electronic device 1100 may display content (e.g., an icon) (not shown) for providing a notification that the unlicensed band preferred mode is set on the screen 1110.

When the user applies an input to the item 1112 associated with the unlicensed band preferred mode on the screen 1110, the electronic device 1100 may display a screen (e.g., a screen 1300 of FIG. 13) including an item for setting a condition for triggering the unlicensed band preferred mode. In an embodiment, the screen 1110 may be a default screen or a setting application screen. The screen 1110 may display items 1120, 1122, 1124, 1126, and 1128 for increasing convenience of the user. For example, the screen 1110 may display the item 1120 or 1128 associated with configuring a network. The time associated with configuring the network may include at least one of items respectively associated with wireless-fidelity (Wi-Fi), Bluetooth, near field communication (NFC), and a cellular network. The cellular network may be, for example, long term evolution (LTE).

Figure 12:
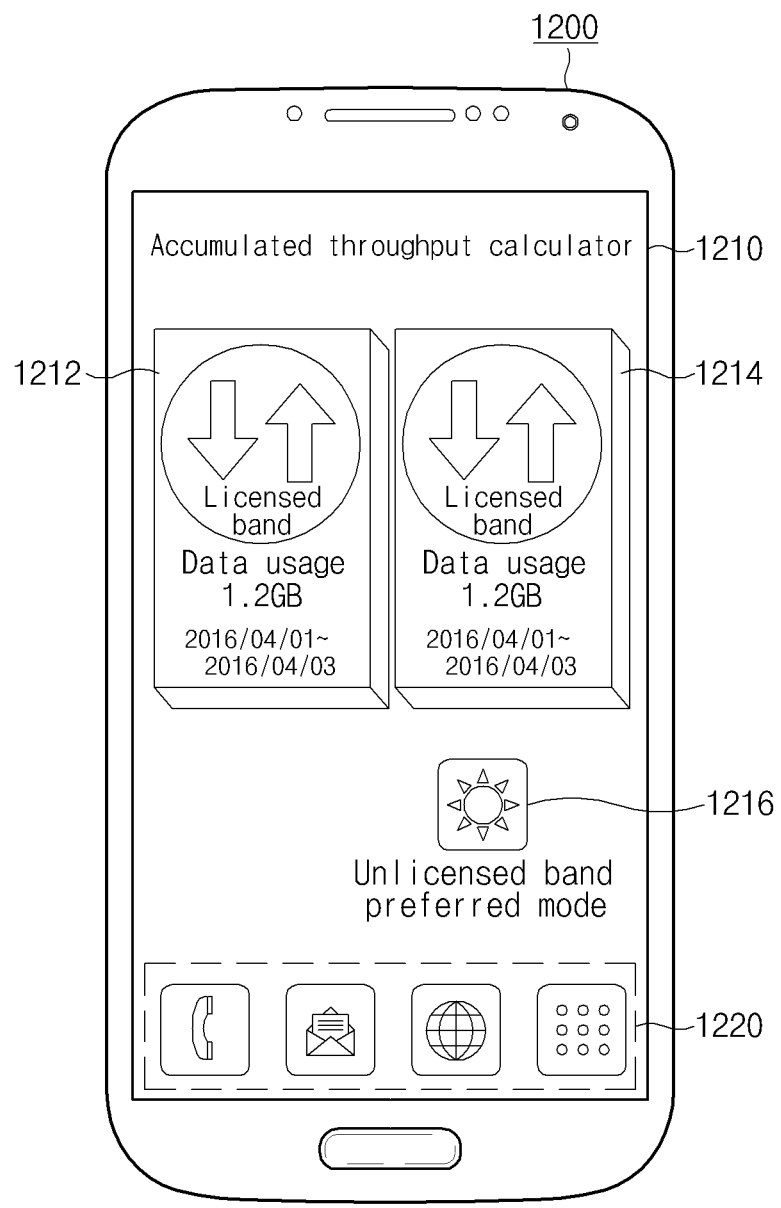
FIG. 12 illustrates an exemplary user interface output on an electronic device according to another embodiment of the disclosure.

FIG. 12 illustrates an exemplary user interface output on an electronic device according to another embodiment of the disclosure.

Referring to FIG. 12, an electronic device 1200 according to an embodiment may display a screen 1210 including information associated with an amount of data (e.g., usage or an amount of transmission) on an unlicensed band or a licensed band. In an embodiment, when a user executes an application associated with the amount of data, the electronic device 1200 may display the screen 1210.

According to an embodiment, the electronic device 1200 may display a first item 1212 which displays the data usage on the licensed band and/or a second time 1214 which displays the data usage on the unlicensed band, on the screen 1210.

In an embodiment, the first item 1212 may include a licensed band indication, an indication of a period when data is used, and/or the data usage. For example, the electronic device 1200 may display a period when data is used, on a month-by-month basis. The period when the data is used may be set by the user. The data usage may be data usage on the licensed band during the period when the data is used. The second item 1214 may include an unlicensed band indication, an indication of a period when data is used, and/or the data usage.

According to an embodiment, when the electronic device 1200 operates in a normal mode, it may further display or enable an item 1216 associated with an unlicensed band preferred mode on a screen 1210 to immediately set the unlicensed band preferred mode. In an embodiment, when the user applies a touch input to the item 1216, the electronic device 1200 may enable the unlicensed band preferred mode.

According to an embodiment, the electronic device 1200 may display items 1220 for executing specific applications on the screen 1210. For example, the specific application may correspond to a phone application or a text application.

Figure 13:
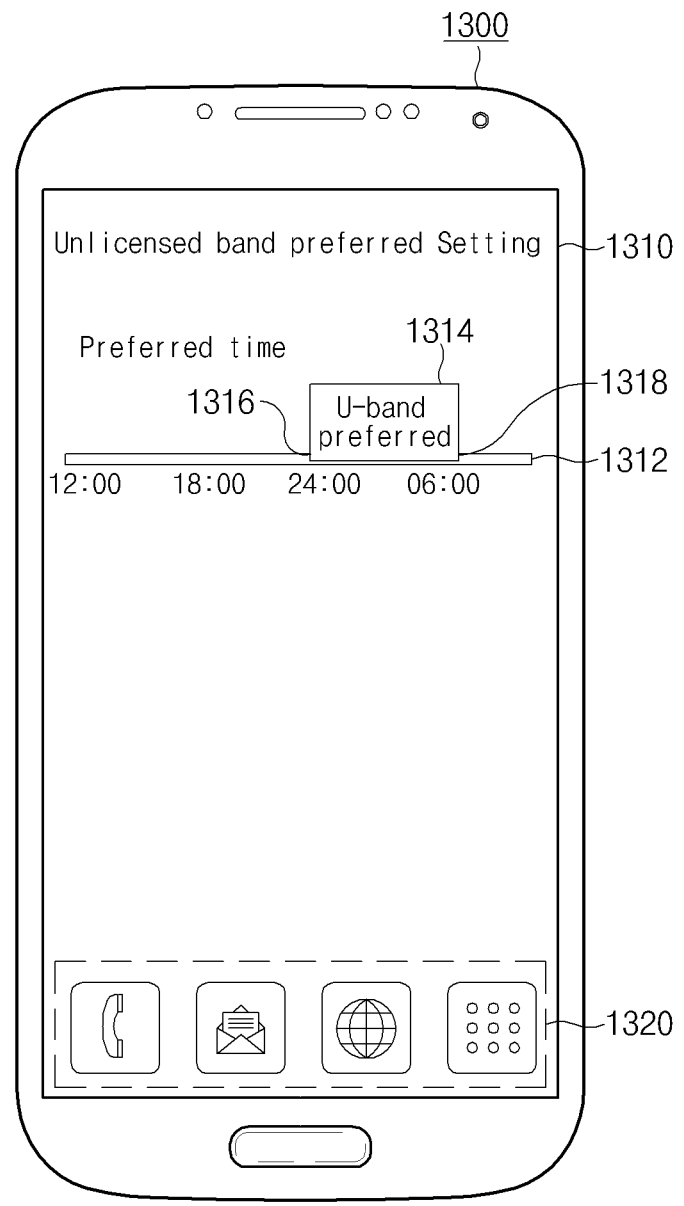
FIG. 13 illustrates an exemplary user interface output on an electronic device according to another embodiment of the disclosure.

FIG. 13 illustrates an exemplary user interface output on an electronic device according to another embodiment of the disclosure.

Referring to FIG. 13, an electronic device 1300 according to an embodiment may execute a configuration application for an unlicensed band preferred mode based on an input of a user. In an embodiment, when the configuration application is executed, the electronic device 1300 may display a screen 1310. The electronic device 1300 may display an item capable of obtaining various settings for the unlicensed band preferred mode on the screen 1310. For example, the electronic device 1300 may display an item 1312 for selecting a time region on the screen 1310.

When the user applies an input (e.g., a touch input or a drag) on the item 1312 of the screen 1310, the electronic device 1300 may display a time region corresponding to the input. For example, the electronic device 1300 may set 24:00 to 6:00 corresponding to a time region when the user sleeps to a time region taken to operate in the unlicensed band preferred mode. The electronic device 1300 may regard the corresponding period as a time when the user does not use data frequently to receive data over an inexpensive unlicensed band although receiving the data late.

In an embodiment, when the user applies a touch input to set a start point 1316 or when the user drags an item for setting the start point 1316, the electronic device 1300 may display the start point 1316. For example, when the user applies a touch input to set an end point 1318 or when the user drags an item for setting the end point 1318, the electronic device 1300 may display the end point 1318. The electronic device 1300 may display a time interval 1314 in which the unlicensed band preferred mode is set. The electronic device 1300 may display the time interval on the item 1312. The electronic device 1300 may perform a setting for the unlicensed band mode based on the user setting. For example, an electronic device 600 of FIG. 6 may set a specified condition as when the time interval is met.

In an embodiment, the electronic device 1300 may display items 1320 for executing specific applications on the screen 1310. For example, the specific application may correspond to a phone application or a text application.

Figure 14:
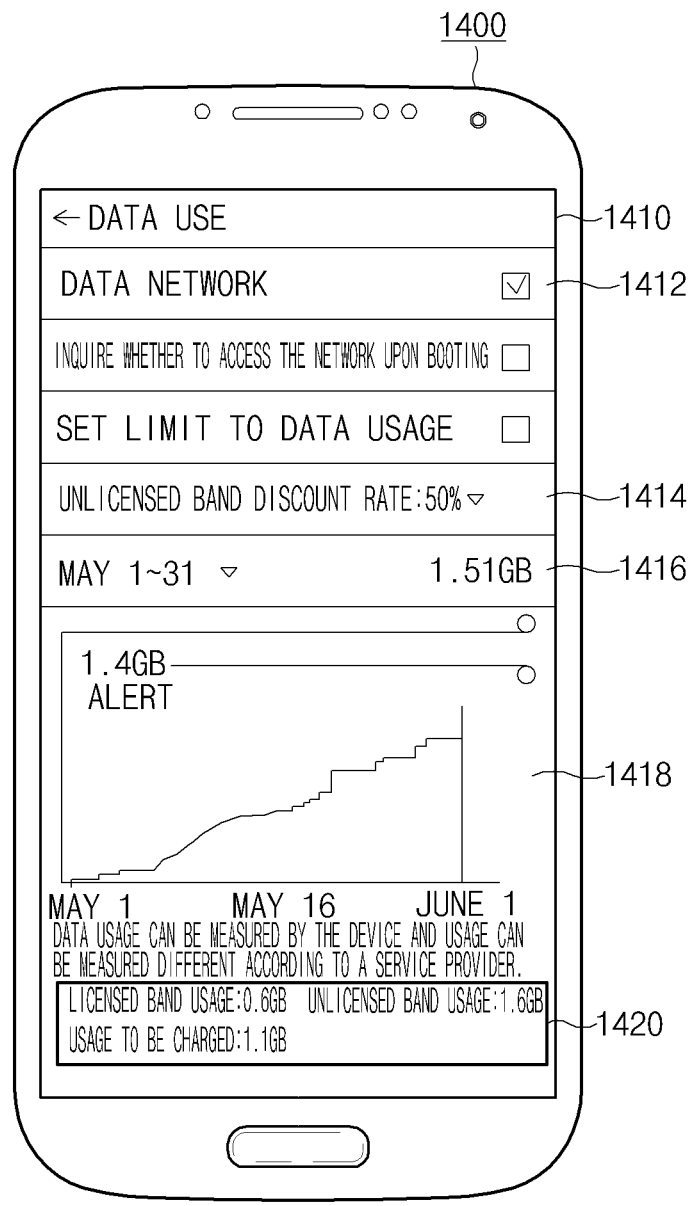
FIG. 14 illustrates an exemplary user interface output on an electronic device according to another embodiment of the disclosure.

FIG. 14 illustrates an exemplary user interface output on an electronic device according to another embodiment of the disclosure.

Referring to FIG. 14, an electronic device 1400 according to an embodiment may execute an application associated with data use based on a user input.

According to an embodiment, when the application associated with data use is executed, the electronic device 1400 may display a screen 1410. According to an embodiment, because the electronic device 1400 differently generate licensed band charging information and unlicensed band charging information, it may further display information 1414 about a discount rate of a relatively inexpensive unlicensed band on the screen 1410. For example, as shown in the screen 1410, the electronic device 1400 may display a charging discount rate (e.g., 50%) of a licensed band to an unlicensed band. In an embodiment, the charging discount rate of the unlicensed band may be an item capable of being corrected by a user input. In an embodiment, the discount rate of the unlicensed band may be set according to a tariff a user joins.

According to an embodiment, the screen 1410 may include an item 1412 about whether to use a used data network or cellular network. In an embodiment, whether to use the data network may be set by an input of the user.

In an embodiment, the screen 1410 may display a graph 1418 indicating data usage. The screen 1410 may include data usage information 1416 during a certain period. The screen 1410 may include abbreviated information 1420 about data usage to be charged.

The abbreviated information may include data usage on a licensed band, data usage on an unlicensed band, and/or data usage to be charged. The electronic device 1400 may display the abbreviated information 1420 below the screen 1410 or the graph 1418. The data usage on the licensed band, the data usage on the unlicensed band, and/or the data usage to be charged may be a result calculated by the electronic device 1400.

The data usage to be charged may indicate the sum in which licensed band usage and/or a discount rate for unlicensed band usage is reflected. For example, referring to the item 1420 of FIG. 14, the discount rate of 50% is reflected because the unlicensed band usage is 1.0 GB, usages charged for the unlicensed band usage may be 0.5 GB. By adding usage to be charged, in which a discount rate is reflected in the unlicensed band usage, to the licensed band usage of 0.6 GB, the total usage to be charged may be 1.1 GB.

FIG. 15 illustrates an electronic device in a network environment system, according to various embodiments.

Referring to FIG. 15, according to various embodiments, an electronic device 1501, a first electronic device 1502, a second electronic device 1504, or a server 1506 may be connected each other over a network 1562 or a short range communication 1564. The electronic device 1501 may include a bus 1510, a processor 1520, a memory 1530, an input/output interface 1550, a display 1560, and a communication interface 1570. According to an embodiment, the electronic device 1501 may not include at least one of the above-described components or may further include other component(s).

For example, the bus 1510 may interconnect the above-described components 1510 to 1570 and may include a circuit for conveying communications (e.g., a control message and/or data) among the above-described components.

The processor 1520 may include one or more of a central processing unit (CPU), an application processor (AP), or a communication processor (CP). For example, the processor 1520 may perform an arithmetic operation or data processing associated with control and/or communication of at least other components of the electronic device 1501.

The memory 1530 may include a volatile and/or nonvolatile memory. For example, the memory 1530 may store commands or data associated with at least one other component(s) of the electronic device 1501. According to an embodiment, the memory 1530 may store software and/or a program 1540. The program 1540 may include, for example, a kernel 1541, a middleware 1543, an application programming interface (API) 1545, and/or an application program (or "an application") 1547. At least a part of the kernel 1541, the middleware 1543, or the API 1545 may be referred to as an "operating system (OS)".

For example, the kernel 1541 may control or manage system resources (e.g., the bus 1510, the processor 1520, the memory 1530, and the like) that are used to execute operations or functions of other programs (e.g., the middleware 1543, the API 1545, and the application program 1547). Furthermore, the kernel 1541 may provide an interface that allows the middleware 1543, the API 1545, or the application program 1547 to access discrete components of the electronic device 1501 so as to control or manage system resources.

The middleware 1543 may perform, for example, a mediation role such that the API 1545 or the application program 1547 communicates with the kernel 1541 to exchange data.

Furthermore, the middleware 1543 may process task requests received from the application program 1547 according to a priority. For example, the middleware 1543 may assign the priority, which makes it possible to use a system resource (e.g., the bus 1510, the processor 1520, the memory 1530, or the like) of the electronic device 1501, to at least one of the application program 1547. For example, the middleware 1543 may process the one or more task requests according to the priority assigned to the at least one, which makes it possible to perform scheduling or load balancing on the one or more task requests.

The API 1545 may be, for example, an interface through which the application program 1547 controls a function provided by the kernel 1541 or the middleware 1543, and may include, for example, at least one interface or function (e.g., an instruction) for a file control, a window control, image processing, a character control, or the like.

The input/output interface 1550 may play a role, for example, of an interface which transmits a command or data input from a user or another external device, to other component(s) of the electronic device 1501. Furthermore, the input/output interface 1550 may output a command or data, received from other component(s) of the electronic device 1501, to a user or another external device.

The display 1560 may include, for example, a liquid crystal display (LCD), a light-emitting diode (LED) display, an organic LED (OLED) display, a microelectromechanical systems (MEMS) display, or an electronic paper display. The display 1560 may display, for example, various contents (e.g., a text, an image, a video, an icon, a symbol, and the like) to a user. The display 1560 may include a touch screen and may receive, for example, a touch, gesture, proximity, or hovering input using an electronic pen or a part of a user's body.

For example, the communication interface 1570 may establish communication between the electronic device 1501 and an external device (e.g., the first electronic device 1502, the second electronic device 1504, or the server 1506). For example, the communication interface 1570 may be connected to the network 1562 over wireless communication or wired communication to communicate with the external device (e.g., the second electronic device 1504 or the server 1506).

The wireless communication may use at least one of, for example, long-term evolution (LTE), LTE Advanced (LTE-A), Code Division Multiple Access (CDMA), Wideband CDMA (WCDMA), Universal Mobile Telecommunications System (UMTS), Wireless Broadband (WiBro), Global System for Mobile Communications (GSM), or the like, as a cellular communication protocol. Furthermore, the wireless communication may include, for example, the short range communication 1564. The short range communication 1564 may include at least one of wireless fidelity (Wi-Fi), Bluetooth, near field communication (NFC), magnetic stripe transmission (MST), a global navigation satellite system (GNSS), or the like.

The MST may generate a pulse in response to transmission data using an electromagnetic signal, and the pulse may generate a magnetic field signal. The electronic device 1501 may transfer the magnetic field signal to point of sale (POS), and the POS may detect the magnetic field signal using a MST reader. The POS may recover the data by converting the detected magnetic field signal to an electrical signal.

The GNSS may include at least one of, for example, a global positioning system (GPS), a global navigation satellite system (Glonass), a Beidou navigation satellite system (hereinafter referred to as "Beidou"), or an European global satellite-based navigation system (hereinafter referred to as "Galileo") based on an available region, a bandwidth, or the like. Hereinafter, in the disclosure, "GPS" and "GNSS" may be interchangeably used. The wired communication may include at least one of, for example, a universal serial bus (USB), a high definition multimedia interface (HDMI), a recommended standard-232 (RS-232), a plain old telephone service (POTS), or the like. The network 1562 may include at least one of telecommunications networks, for example, a computer network (e.g., LAN or WAN), an Internet, or a telephone network.

Each of the first and second electronic devices 1502 and 1504 may be a device of which the type is different from or the same as that of the electronic device 1501. According to an embodiment, the server 1506 may include a group of one or more servers. According to various embodiments, all or a portion of operations that the electronic device 1501 will perform may be executed by another or plural electronic devices (e.g., the first electronic device 1502, the second electronic device 1504 or the server 1506). According to an embodiment, in the case where the electronic device 1501 executes any function or service automatically or in response to a request, the electronic device 1501 may not perform the function or the service internally, but, alternatively additionally, it may request at least a portion of a function associated with the electronic device 1501 from another device (e.g., the electronic device 1502 or 1504 or the server 1506). The other electronic device may execute the requested function or additional function and may transmit the execution result to the electronic device 1501. The electronic device 1501 may provide the requested function or service using the received result or may additionally process the received result to provide the requested function or service. To this end, for example, cloud computing, distributed computing, or client-server computing may be used.

Figure 16:
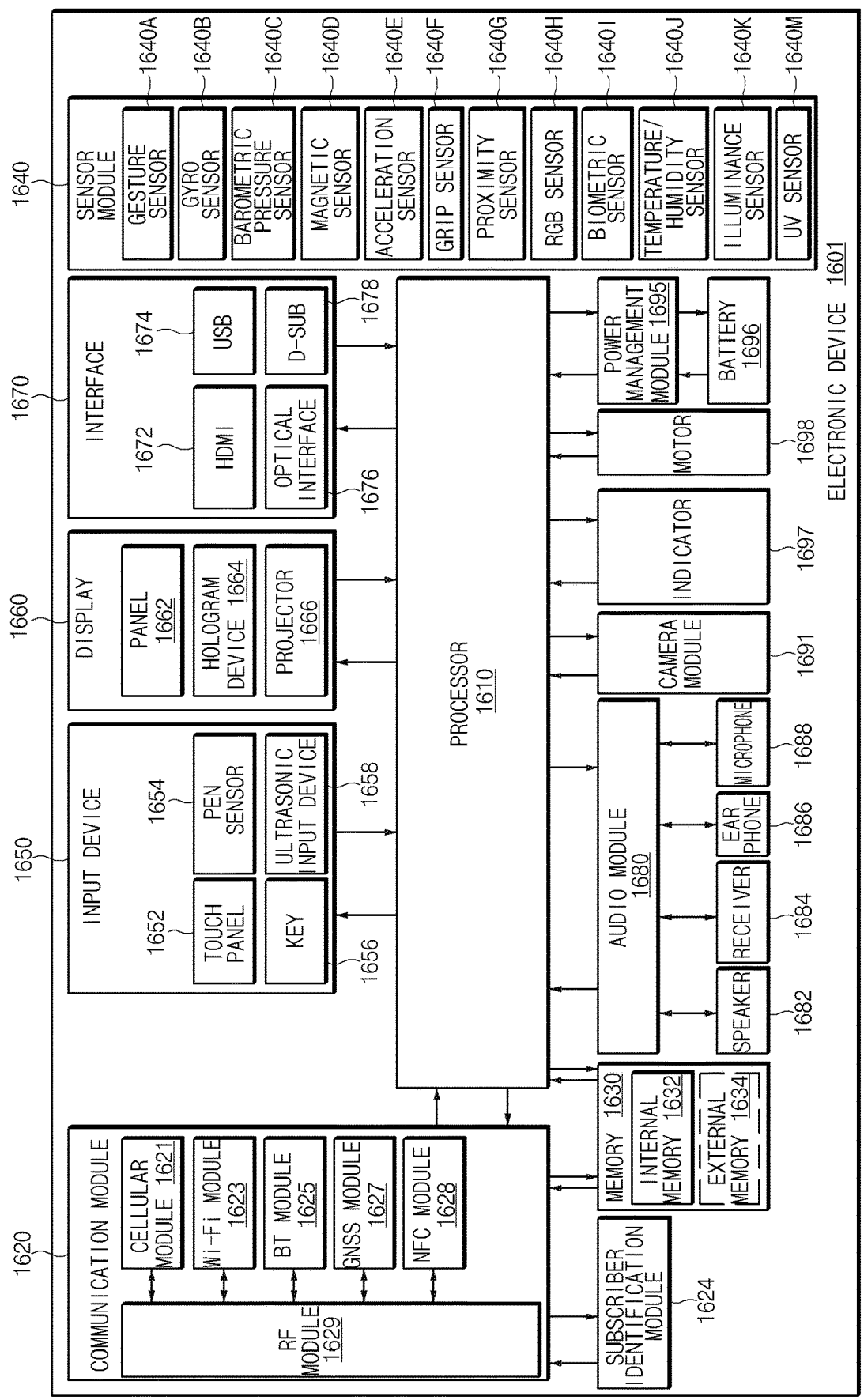
FIG. 16 illustrates a block diagram of an electronic device according to various embodiments.

FIG. 16 illustrates a block diagram of an electronic device, according to various embodiments.

Referring to FIG. 16, an electronic device 1601 may include, for example, all or a part of the electronic device 1501 illustrated in FIG. 15. The electronic device 1601 may include one or more processors (e.g., an application processor (AP)) 1610, a communication module 1620, a subscriber identification module 1624, a memory 1630, a sensor module 1640, an input device 1650, a display 1660, an interface 1670, an audio module 1680, a camera module 1691, a power management module 1695, a battery 1696, an indicator 1697, and a motor 1698.

The processor 1610 may drive, for example, an operating system (OS) or an application to control a plurality of hardware or software components connected to the processor 1610 and may process and compute a variety of data. For example, the processor 1610 may be implemented with a System on Chip (SoC). According to an embodiment, the processor 1610 may further include a graphic processing unit (GPU) and/or an image signal processor. The processor 1610 may include at least a part (e.g., a cellular module 1621) of components illustrated in FIG. 7. The processor 1610 may load a command or data, which is received from at least one of other components (e.g., a nonvolatile memory), into a volatile memory and process the loaded command or data. The processor 1610 may store a variety of data in the nonvolatile memory.

The communication module 1620 may be configured the same as or similar to the communication interface 1570 of FIG. 15. The communication module 1620 may include the cellular module 1621, a Wi-Fi module 1623, a Bluetooth (BT) module 1625, a GNSS module 1627 (e.g., a GPS module, a Glonass module, a Beidou module, or a Galileo module), a near field communication (NFC) module 1628, a MST module and a radio frequency (RF) module 1629.

The cellular module 1621 may provide, for example, voice communication, video communication, a character service, an Internet service, or the like over a communication network. According to an embodiment, the cellular module 1621 may perform discrimination and authentication of the electronic device 1601 within a communication network by using the subscriber identification module (e.g., a SIM card) 1624. According to an embodiment, the cellular module 1621 may perform at least a portion of functions that the processor 1610 provides. According to an embodiment, the cellular module 1621 may include a communication processor (CP).

Each of the Wi-Fi module 1623, the BT module 1625, the GNSS module 1627, the NFC module 1628, or the MST module may include a processor for processing data exchanged through a corresponding module, for example. According to an embodiment, at least a part (e.g., two or more) of the cellular module 1621, the Wi-Fi module 1623, the BT module 1625, the GNSS module 1627, the NFC module 1628, or the MST module may be included within one Integrated Circuit (IC) or an IC package.

For example, the RF module 1629 may transmit and receive a communication signal (e.g., an RF signal). For example, the RF module 1629 may include a transceiver, a power amplifier module (PAM), a frequency filter, a low noise amplifier (LNA), an antenna, or the like. According to another embodiment, at least one of the cellular module 1621, the Wi-Fi module 1623, the BT module 1625, the GNSS module 1627, the NFC module 1628, or the MST module may transmit and receive an RF signal through a separate RF module.

The subscriber identification module 1624 may include, for example, a card and/or embedded SIM that includes a subscriber identification module and may include unique identify information (e.g., integrated circuit card identifier (ICCID)) or subscriber information (e.g., international mobile subscriber identity (IMSI)).

The memory 1630 (e.g., the memory 1530) may include an internal memory 1632 or an external memory 1634. For example, the internal memory 1632 may include at least one of a volatile memory (e.g., a dynamic random access memory (DRAM), a static RAM (SRAM), a synchronous DRAM (SDRAM), or the like), a nonvolatile memory (e.g., a one-time programmable read only memory (OTPROM), a programmable ROM (PROM), an erasable and programmable ROM (EPROM), an electrically erasable and programmable ROM (EEPROM), a mask ROM, a flash ROM, a flash memory (e.g., a NAND flash memory or a NOR flash memory), or the like), a hard drive, or a solid state drive (SSD).

The external memory 1634 may further include a flash drive such as compact flash (CF), secure digital (SD), micro secure digital (Micro-SD), mini secure digital (Mini-SD), extreme digital (xD), a multimedia card (MMC), a memory stick, or the like. The external memory 1634 may be operatively and/or physically connected to the electronic device 1601 through various interfaces.

A security module 1636 may be a module that includes a storage space of which a security level is higher than that of the memory 1630 and may be a circuit that guarantees safe data storage and a protected execution environment. The security module 1636 may be implemented with a separate circuit and may include a separate processor. For example, the security module 1636 may be in a smart chip or a secure digital (SD) card, which is removable, or may include an embedded secure element (eSE) embedded in a fixed chip of the electronic device 1601. Furthermore, the security module 1636 may operate based on an operating system (OS) that is different from the OS of the electronic device 1601. For example, the security module 1636 may operate based on java card open platform (JCOP) OS.

The sensor module 1640 may measure, for example, a physical quantity or may detect an operation state of the electronic device 1601. The sensor module 1640 may convert the measured or detected information to an electric signal. For example, the sensor module 1640 may include at least one of a gesture sensor 1640A, a gyro sensor 1640B, a barometric pressure sensor 1640C, a magnetic sensor 1640D, an acceleration sensor 1640E, a grip sensor 1640F, the proximity sensor 1640G, a color sensor 1640H (e.g., red, green, blue (RGB) sensor), a biometric sensor 1640I, a temperature/humidity sensor 1640J, an illuminance sensor 1640K, or an UV sensor 1640M. Although not illustrated, additionally or alternatively, the sensor module 1640 may further include, for example, an E-nose sensor, an electromyography (EMG) sensor, an electroencephalogram (EEG) sensor, an electrocardiogram (ECG) sensor, an infrared (IR) sensor, an iris sensor, and/or a fingerprint sensor. The sensor module 1640 may further include a control circuit for controlling at least one or more sensors included therein. According to an embodiment, the electronic device 1601 may further include a processor that is a part of the processor 1610 or independent of the processor 1610 and is configured to control the sensor module 1640. The processor may control the sensor module 1640 while the processor 1610 remains at a sleep state.

The input device 1650 may include, for example, a touch panel 1652, a (digital) pen sensor 1654, a key 1656, or an ultrasonic input unit 1658. For example, the touch panel 1652 may use at least one of capacitive, resistive, infrared and ultrasonic detecting methods. Also, the touch panel 1652 may further include a control circuit. The touch panel 1652 may further include a tactile layer to provide a tactile reaction to a user.

The (digital) pen sensor 1654 may be, for example, a part of a touch panel or may include an additional sheet for recognition. The key 1656 may include, for example, a physical button, an optical key, a keypad, or the like. The ultrasonic input device 1658 may detect (or sense) an ultrasonic signal, which is generated from an input device, through a microphone (e.g., a microphone 1688) and may check data corresponding to the detected ultrasonic signal.

The display 1660 (e.g., the display 1560) may include a panel 1662, a hologram device 1664, or a projector 1666. The panel 1662 may be the same as or similar to the display 1560 illustrated in FIG. 15. The panel 1662 may be implemented, for example, to be flexible, transparent or wearable. The panel 1662 and the touch panel 1652 may be integrated into a single module. The hologram device 1664 may display a stereoscopic image in a space using a light interference phenomenon. The projector 1666 may project light onto a screen so as to display an image. For example, the screen may be arranged in the inside or the outside of the electronic device 1601. According to an embodiment, the display 1660 may further include a control circuit for controlling the panel 1662, the hologram device 1664, or the projector 1666.

The interface 1670 may include, for example, a high-definition multimedia interface (HDMI) 1672, a universal serial bus (USB) 1674, an optical interface 1676, or a D-subminiature (D-sub) 1678. The interface 1670 may be included, for example, in the communication interface 1570 illustrated in FIG. 15. Additionally or alternatively, the interface 1670 may include, for example, a mobile high definition link (MHL) interface, a SD card/multi-media card (MMC) interface, or an infrared data association (IrDA) standard interface.

The audio module 1680 may convert a sound and an electric signal in dual directions. At least a component of the audio module 1680 may be included, for example, in the input/output interface 1550 illustrated in FIG. 15. The audio module 1680 may process, for example, sound information that is input or output through a speaker 1682, a receiver 1684, an earphone 1686, or the microphone 1688.

For example, the camera module 1691 may shoot a still image or a video. According to an embodiment, the camera module 1691 may include at least one or more image sensors (e.g., a front sensor or a rear sensor), a lens, an image signal processor (ISP), or a flash (e.g., an LED or a xenon lamp).

The power management module 1695 may manage, for example, power of the electronic device 1601. According to an embodiment, a power management integrated circuit (PMIC), a charger IC, or a battery or fuel gauge may be included in the power management module 1695. The PMIC may have a wired charging method and/or a wireless charging method. The wireless charging method may include, for example, a magnetic resonance method, a magnetic induction method or an electromagnetic method and may further include an additional circuit, for example, a coil loop, a resonant circuit, or a rectifier, and the like. The battery gauge may measure, for example, a remaining capacity of the battery 1696 and a voltage, current or temperature thereof while the battery is charged. The battery 1696 may include, for example, a rechargeable battery and/or a solar battery.

The indicator 1697 may display a specific state of the electronic device 1601 or a part thereof (e.g., the processor 1610), such as a booting state, a message state, a charging state, and the like. The motor 1698 may convert an electrical signal into a mechanical vibration and may generate the following effects: vibration, haptic, and the like. Although not illustrated, a processing device (e.g., a GPU) for supporting a mobile TV may be included in the electronic device 1601. The processing device for supporting the mobile TV may process media data according to the standards of digital multimedia broadcasting (DMB), digital video broadcasting (DVB), MediaFlo™, or the like.

Each of the above-mentioned components of the electronic device according to various embodiments of the disclosure may be configured with one or more parts, and the names of the components may be changed according to the type of the electronic device. In various embodiments, the electronic device may include at least one of the above-mentioned components, and some components may be omitted or other additional components may be added. Furthermore, some of the components of the electronic device according to various embodiments may be combined with each other so as to form one entity, so that the functions of the components may be performed in the same manner as before the combination.

The term "module" used in the disclosure may represent, for example, a unit including one or more combinations of hardware, software and firmware. The term "module" may be interchangeably used with the terms "unit", "logic", "logical block", "part" and "circuit". The "module" may be a minimum unit of an integrated part or may be a part thereof. The "module" may be a minimum unit for performing one or more functions or a part thereof. The "module" may be implemented mechanically or electronically. For example, the "module" may include at least one of an application-specific IC (ASIC) chip, a field-programmable gate array (FPGA), and a programmable-logic device for performing some operations, which are known or will be developed.

At least a part of an apparatus (e.g., modules or functions thereof) or a method (e.g., operations) according to various embodiments may be, for example, implemented by instructions stored in a computer-readable storage media in the form of a program module. The instruction, when executed by a processor (e.g., the processor 1520), may cause the one or more processors to perform a function corresponding to the instruction. The computer-readable storage media, for example, may be the memory 1530.

A computer-readable recording medium may include a hard disk, a floppy disk, a magnetic media (e.g., a magnetic tape), an optical media (e.g., a compact disc read only memory (CD-ROM) and a digital versatile disc (DVD), a magneto-optical media (e.g., a floptical disk)), and hardware devices (e.g., a read only memory (ROM), a random access memory (RAM), or a flash memory). Also, the one or more instructions may contain a code made by a compiler or a code executable by an interpreter. The above hardware unit may be configured to operate via one or more software modules for performing an operation according to various embodiments, and vice versa.

A module or a program module according to various embodiments may include at least one of the above components, or a part of the above components may be omitted, or additional other components may be further included. Operations performed by a module, a program module, or other components according to various embodiments may be executed sequentially, in parallel, repeatedly, or in a heuristic method. In addition, some operations may be executed in different sequences or may be omitted. Alternatively, other operations may be added.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. An electronic device in a wireless communication system, the electronic device comprising:
   communication circuitry configured to support to transmit and receive data with a first cell of a base station on a licensed band and a second cell of the base station on an unlicensed band;
   a processor; and
   a memory electrically connected with the processor,
   wherein the memory stores instructions, when executed, causing the processor to:
      measure a channel quality indicator (CQI) of the first cell based on the data from the first cell;
      identify that the unlicensed band is preferred than the licensed band;
      in response to the identification, generate another CQI that is lower than the measured CQI of the first cell; and transmit control information for inducing to increase an amount of data transmitted and received over the unlicensed band to the base station, wherein the control information includes the another CQI.

2. The electronic device of claim 1, wherein at least a portion of the amount of data transmitted and received over the unlicensed band is an amount of data biased from the licensed band after transmitting the control information.

3. The electronic device of claim 1, wherein the memory includes instructions, when executed, causing the processor to:

identify that the unlicensed band is preferred than the licensed band based on first data usage on the licensed band.

4. The electronic device of claim 3, wherein the memory includes instructions, when executed, causing the processor to:

identify that the unlicensed band is preferred than the licensed band based on charging information corresponding to the first data usage and second data usage on the unlicensed band.

5. The electronic device of claim 4, wherein the memory includes instructions, when executed, causing the processor to:

identify that the unlicensed band is preferred than the licensed band based on an input through a user interface.

6. The electronic device of claim 1, wherein the memory stores instructions, when executed, causing the processor to transmit the control information on the licensed band.

7. A method for performing unlicensed band communication in an electronic device, the method comprising:

configuring a first cell of a base station on a licensed band and a second cell of the base station on an unlicensed band;

measuring a channel quality indicator (CQI) of the first cell based on data from the first cell;

identifying that the unlicensed band is preferred than the licensed band;

in response to the identification, generating another CQI that is lower than the measured CQI of the first cell; and transmitting control information for inducing to increase an amount of data transmitted and received over the unlicensed band to the base station, wherein the control information includes the another CQI.

8. The method of claim 7, wherein at least a portion of the amount of data transmitted and received over the unlicensed band is an amount of data biased from the licensed band after transmitting the control information.

9. The method of claim 7, wherein identifying that the unlicensed band is preferred than the licensed band comprises identifying that the unlicensed band is preferred than the licensed band based on first data usage on the licensed band.

10. The method of claim 9, wherein identifying that the unlicensed band is preferred than the licensed band comprises identifying that the unlicensed band is preferred than the licensed band based on charging information corresponding to the first data usage and second data usage on the unlicensed band.

11. The method of claim 10, wherein identifying that the unlicensed band is preferred than the licensed band comprises identifying that the unlicensed band is preferred than the licensed band based on an input through a user interface.

* * * * *